(12) United States Patent
Park et al.

(10) Patent No.: US 9,958,193 B2
(45) Date of Patent: *May 1, 2018

(54) REFRIGERATOR

(71) Applicant: LG Electronics Inc., Seoul (KR)

(72) Inventors: Shinhyun Park, Seoul (KR); Sun Kim, Seoul (KR); Byoungsuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

This patent is subject to a terminal disclaimer.

(21) Appl. No.: 14/882,987

(22) Filed: Oct. 14, 2015

(65) Prior Publication Data

US 2016/0076805 A1     Mar. 17, 2016

Related U.S. Application Data

(63) Continuation of application No. 14/534,033, filed on Nov. 5, 2014.

(30) Foreign Application Priority Data

Nov. 5, 2013  (KR) .................. 10-2013-0133632

(51) Int. Cl.
  *F25D 17/06*   (2006.01)
  *F25B 49/02*   (2006.01)
  (Continued)

(52) U.S. Cl.
  CPC .......... *F25D 17/067* (2013.01); *F25B 27/00* (2013.01); *F25B 49/005* (2013.01);
  (Continued)

(58) Field of Classification Search
  CPC ............... F25B 2700/15; F25B 49/025; F25B 2600/112; F25B 2600/13; F25B 2700/173; F25B 2600/02; F25B 49/022; F25D 21/00
  See application file for complete search history.

(56) References Cited

U.S. PATENT DOCUMENTS

| 4,250,716 A |   | 2/1981  | Huffman |
|---|---|---|---|
| 4,788,827 A | * | 12/1988 | Otani ................... F25D 29/00 340/654 |

(Continued)

FOREIGN PATENT DOCUMENTS

| CN | 1 773 201 A    | 5/2006  |
|---|---|---|
| CN | 202532802 U    | 11/2012 |

(Continued)

OTHER PUBLICATIONS

International Search Report dated Feb. 9, 2015 issued in Application No. PCT/KR2014/010520.

(Continued)

*Primary Examiner* — Kun Kai Ma
(74) *Attorney, Agent, or Firm* — Ked & Associates, LLP

(57) ABSTRACT

Provided is a refrigerator. The refrigerator may include a power supply unit configured to power the refrigerator using commercial power, a battery coupled to the power supply unit and configured to supply auxiliary power to the refrigerator, a power detection unit coupled to the power supply unit and the battery and configured to detect whether power is being supplied from the power supply unit, a driving unit to provide cold air, and a controller configured to control an operational mode of the driving unit based on the detection at the power detection unit. When the power supply unit is supplying power, the driving unit may be controlled to operate in a normal operation mode, and when the power supply unit is not supplying power, the driving unit may be (Continued)

controlled to operate in a power failure operation mode and to control the power to be supplied from the battery.

11 Claims, 21 Drawing Sheets

(51) Int. Cl.
*F25D 21/00* (2006.01)
*F25B 27/00* (2006.01)
*F25B 49/00* (2006.01)
*F25D 21/14* (2006.01)
*F25B 1/00* (2006.01)

(52) U.S. Cl.
CPC .......... *F25B 49/022* (2013.01); *F25D 17/065* (2013.01); *F25D 21/002* (2013.01); *F25B 1/00* (2013.01); *F25B 49/025* (2013.01); *F25B 2500/06* (2013.01); *F25B 2600/021* (2013.01); *F25B 2600/0251* (2013.01); *F25B 2600/112* (2013.01); *F25B 2600/23* (2013.01); *F25B 2700/15* (2013.01); *F25D 21/14* (2013.01); *F25D 2321/145* (2013.01); *F25D 2400/28* (2013.01); *Y02B 30/741* (2013.01); *Y02B 30/743* (2013.01)

(56) References Cited

U.S. PATENT DOCUMENTS

| | | | | |
|---|---|---|---|---|
| 5,148,686 A * | 9/1992 | You | ................. | G05B 19/048 62/140 |
| 5,433,082 A * | 7/1995 | Trulaske | ............... | A47F 3/0443 62/255 |
| 5,924,295 A * | 7/1999 | Park | ................. | F25D 29/00 62/126 |
| 8,070,569 B2 * | 12/2011 | Palmer | ................. | F24F 7/06 454/184 |
| 8,161,763 B2 * | 4/2012 | Yun | ................. | F25B 5/02 62/200 |
| 9,618,254 B2 | 4/2017 | Jo et al. | | |
| 2002/0073719 A1 * | 6/2002 | Elwood | ................. | F25D 29/00 62/127 |
| 2004/0084968 A1 * | 5/2004 | Lee | ................. | H02J 9/062 307/66 |
| 2004/0093125 A1 * | 5/2004 | Schanin | ................. | F25D 29/00 700/296 |
| 2005/0099750 A1 * | 5/2005 | Takahashi | ................. | H02J 9/061 361/92 |
| 2006/0179870 A1 * | 8/2006 | Byrne | ................. | F25B 27/00 62/408 |
| 2006/0260335 A1 * | 11/2006 | Montuoro | ................. | F25B 49/02 62/236 |
| 2008/0296975 A1 * | 12/2008 | Shakespeare | ................. | H02J 9/065 307/66 |
| 2009/0045680 A1 * | 2/2009 | Litch | ................. | F25D 17/065 307/66 |
| 2009/0243549 A1 * | 10/2009 | Matsumura | ................. | H01M 10/44 320/155 |
| 2012/0223719 A1 * | 9/2012 | Jo | ................. | G01R 31/02 324/500 |
| 2013/0093242 A1 * | 4/2013 | Mok | ................. | H02J 9/005 307/23 |
| 2013/0106331 A1 * | 5/2013 | Guzelgunler | ................. | H02P 29/02 318/400.21 |
| 2013/0139536 A1 * | 6/2013 | Jeong | ................. | F04B 35/045 62/228.1 |

FOREIGN PATENT DOCUMENTS

| | | | |
|---|---|---|---|
| CN | 103175361 | | 6/2013 |
| JP | 11-230664 A | | 8/1999 |
| JP | 2000-357280 A | | 12/2000 |
| JP | 2008-020120 A | | 1/2008 |
| JP | 2008020120 A | * | 1/2008 |
| JP | 2011058742 A | * | 3/2011 |
| JP | 2012-229866 A | | 11/2012 |
| JP | 2013039013 A | * | 2/2013 |
| JP | 2013-121255 | | 6/2013 |
| KR | 10-0229191 | | 11/1999 |
| KR | 10-2000-0042551 | | 7/2000 |
| KR | 10-0476448 | | 3/2005 |
| KR | 10-2011-0086345 | | 7/2011 |
| KR | 10-2012-0117704 | | 10/2012 |

OTHER PUBLICATIONS

European Search Report dated Mar. 1, 2016 issued in Application No. 14859948.3.
Korean Office Action dated Jun. 24, 2016 issued in Application No. 10-2013-0133632.
Chinese Office Action dated Mar. 21, 2017 issued in Application No. 201480019581.1.
Korean Notice of Allowance dated Dec. 19, 2017 issued in Application No. 10-2013-0133632.

* cited by examiner

REFRIGERATOR

CROSS-REFERENCE TO RELATED APPLICATION(S)

This application is a Continuation application of prior U.S. patent application Ser. No. 14/534,033 filed Nov. 5, 2014 which claims priority under 35 U.S.C. § 119 to Korean Application No. 10-2013-0133632 filed on Nov. 5, 2013, whose entire disclosure are hereby incorporated by reference.

BACKGROUND

1. Field

The present disclosure relates to a refrigerator.

2. Background

A refrigerator is a home appliance providing a low-temperature storage that can be opened and closed by a door to store foods at a low temperature. For this, the refrigerator cools the inside of the storage space by using cool air generated by being heat-exchanged with a refrigerant circulated into a refrigeration cycle to store the foods in an optimum state.

As described above, the refrigerator may maintain the inside thereof at a preset temperature so that foods to be stored in the refrigerator are stored in the optimum state according to characteristics of the foods. Also, to maintain the inside of the refrigerator at the preset temperature, the inside of the refrigerator has to be sealed. In addition, the refrigerator has to be continuously cooled by supplying cool air through the refrigeration cycle.

For this, a power has to be supplied always into the refrigerator. Also, the temperature of the inside of the refrigerator has to be checked to operate a compressor, various fans, a damper, and the like, thereby maintaining the inside of the refrigerator at the preset temperature.

If power failure occurs during the use of the refrigerator, since operations of the compressor, the various fans, the damper, and the like, which are provided in the refrigerator, are stopped, it may be impossible to cool the inside of the refrigerator. Also, if the power failure state remains for a long time, or a door of the refrigerator is frequently opened, the inner temperature of the refrigerator may increase to deteriorate stored foods.

To prepare for the power failure, a cold storage material may be provided in the refrigerator. Thus, when the refrigeration cycle does not operate, the inside of the refrigerator may be cooled by using the cold storage material. Also, the fans may operate by a battery to supply cool air into the refrigerator.

However, although the cooling performance is temporarily maintained in the refrigerator, the cooling performance of the cold storage material may be continuously reduced. Thus, it may be impossible to continuously cool the inside of the refrigerator for a long time.

Also, if the power failure frequently occurs, a separate battery and a power supply device may be provided. Thus, when the power failure occurs, the battery may be connected to the refrigerator to supply a power into the refrigerator.

However, it may be difficult to immediately supply the power into the refrigerator by recognizing the power failure.

Also, a starting voltage required when the refrigerator initially operates may be very high. In addition, when the refrigerator operates for a long time in consideration of operation characteristics of the refrigerator that has to be maintained always in the operating state, power consumption may be large. Thus, to satisfy the above-described conditions, a battery having relatively large capacity may be needed, and thus, manufacturing costs may increase.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. The technical scope of the embodiments will fall within the scope of this disclosure, and addition, deletion and modification of components or parts are possible within the scope of the embodiments.

That is, for convenience of description, although a top mount type refrigerator in which a freezing compartment is provided in an upper portion thereof is described as an example, the present disclosure is not limited to the above-described structure.

Embodiments provide a refrigerator that detects power failure to stably supply a power for operating the refrigerator through a battery and, when the power failure occurs, controls a driving unit to change in a power failure operation mode in which power consumption is low, thereby continuously maintaining cooling performance of the refrigerator even though the power failure occurs. The details of one or more embodiments are set forth in the accompanying drawings and the description below. Other features will be apparent from the description and drawings, and from the claims.

Figure 1:
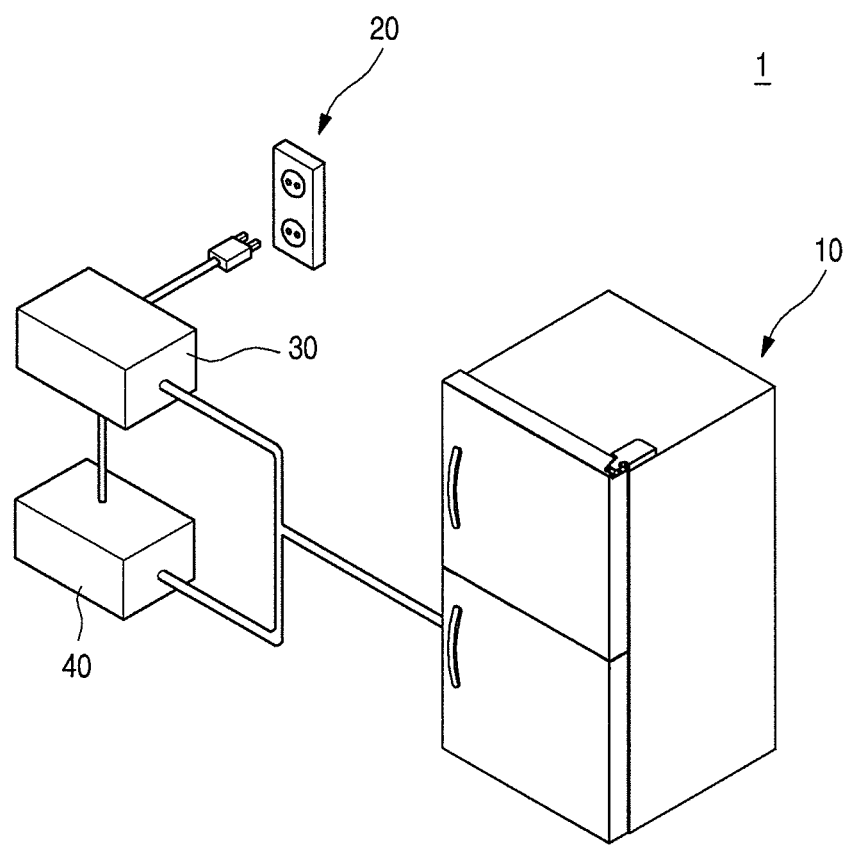
FIG. 1 is a schematic view of a refrigerator according to an embodiment.
Figure 2:
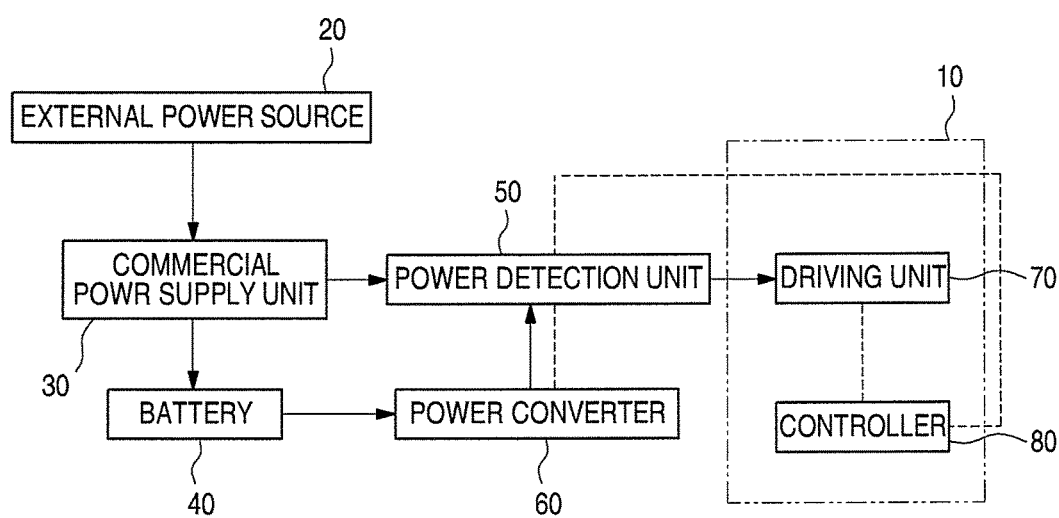
FIG. 2 is a block diagram illustrating constitutions of the refrigerator.

FIG. 1 is a schematic view of a refrigerator according to an embodiment. FIG. 2 is a block diagram illustrating constitutions of the refrigerator. As illustrated in the drawings, in a refrigerator 1 according to an embodiment, a driving unit 70 may operate by a power supplied from the outside or by an operation of a battery 40.

In detail, in general conditions, a power may be supplied into a refrigerator body 10 from a general external power source 20 connected to a socket disposed in a wall. The power of the external power source 20 may be supplied through a commercial power supply unit 30. Then, the power may be supplied into the driving unit 70 via a power detection unit 50.

Here, the commercial power supply unit 30 may be disposed between the external power source 20 such as the socket and the refrigerator body 10. Here, the commercial power supply unit 30, the external power source 20, and the refrigerator body 10 may be connected to each other. Also, the commercial power supply unit 30 may be connected to other home appliances, in addition to the refrigerator, such as a television, a lamp, a radio, or another appropriate type of home appliance, which may require power input, as necessary.

Also, the battery 40 may be connected to the commercial power supply unit 30 and the refrigerator body 10. Also, if the power failure does not occur, the battery 40 may be charged by the commercial power supply unit 30. Thus, the battery 40 may supply power thereof to the driving unit 70 when the battery 40 is fully charged when the power failure occurs. The battery 40 may be a battery that may be recharged and reused. For example, a nickel cadmium battery, a nickel hydrogen battery, a lead storage battery, a lithium ion battery, a lithium polymer battery, or the like may be used as the generally used rechargeable battery. Alternatively, a plurality of batteries may be combined together to form a battery pack. Also, a fuel cell or a battery that is chargeable by using solar energy may be used as the battery.

The battery 40 may be connected to a power converter 60. When the power failure occurs, the power of the battery may be supplied to the driving unit 70. The power converter 60 may not operate in a normal state in which the external power is supplied. Also, the power converter 60 may allow the battery 40 to supply power to the driving unit 70 only when the power failure occurs.

The power converter 60 may convert the power source for supplying the power to be supplied into the refrigerator body 10 by using a signal transmitted from the power detection unit 50 to supply the power through the converted power source. In detail, when the power of the general external power source 20 is inputted through the commercial power supply unit 30, the power converter 60 may allow the power of the external power source 20 to be supplied to the refrigerator body 10 as it is. Also, when the power detection unit 50 detects that the supply of the power from the commercial power supply unit 30 is blocked, the power converter 60 may allow the battery power to be supplied to the refrigerator body 10 from the battery 40.

Also, although the power converter 60 is configured to immediately convert or switch the power source from the external power source 20 to the battery 40 by using the signal of the power detection unit 50 just when the power failure occurs, a user may also directly manipulate the power converter 60 to convert the power source according to the conditions such as a charged amount of the battery 40 or prior use of other home appliances. That is, the power converter 60 may be manipulated by the user to selectively supply the powers of the external power source 20 and the battery 40 to the refrigerator body.

The commercial power supply unit 30 may be connected to the power detection unit 50. The power detection unit 50 may determine whether the power is inputted from the external power source 20 or the battery 40 by analyzing characteristics and states of the power supplied from the external power source 20 and the battery 40 to instruct an operation of the driving unit 70 through a controller 80 according to the determined result.

Here, the power detection unit 50 may detect the characteristics of the input power to determine whether the power is inputted from the external power source 20 or the battery 40. For example, the power detection unit 50 may analyze a voltage, current, a frequency, or frequency components of the input power to compare the analyzed results to previously stored data or directly inputted information, thereby detecting variations in characteristics of the input power so that the power of the battery 40 is applied instead of the power of the external power source 20.

The commercial power supply unit 30, the power detection unit 50, the power converter 60, and the battery 40 may be integrated with each other as one unit, or at least two of the commercial power supply unit 30, the power detection unit 50, the power converter 60, and the battery 40 may be combined with each other to form a module. Alternatively, the commercial power supply unit 30, the power detection unit 50, the power converter 60, and the battery 40 may be provided separate from each other. Also, as necessary, the commercial power supply unit 30, the power detection unit 50, the power converter 60, and the battery 40 may be connected to the outside of the refrigerator body 10, and at least one of the commercial power supply unit 30, the power detection unit 50, the power converter 60, and the battery 40 may be installed inside the refrigerator body 10.

Figure 3:
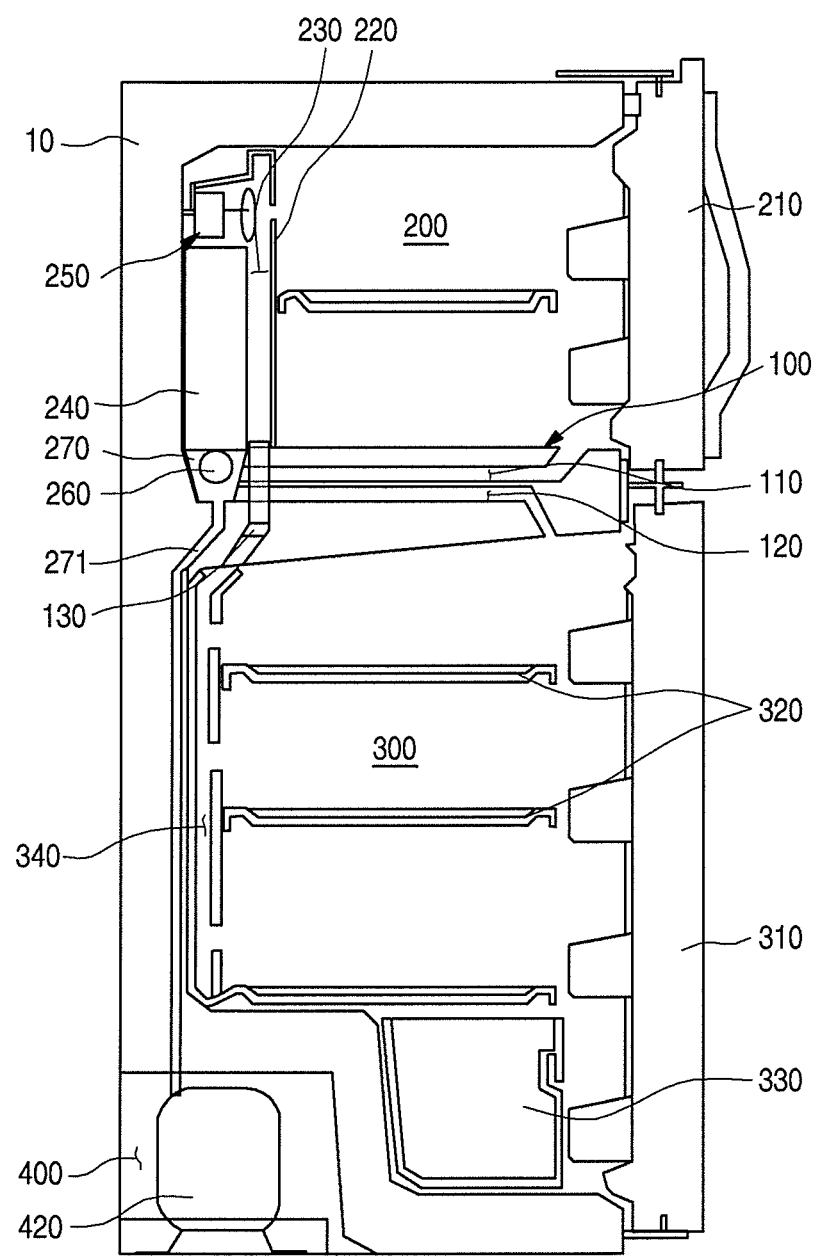
FIG. 3 is a schematic cross-sectional view illustrating an inner structure of the refrigerator.
Figure 4:
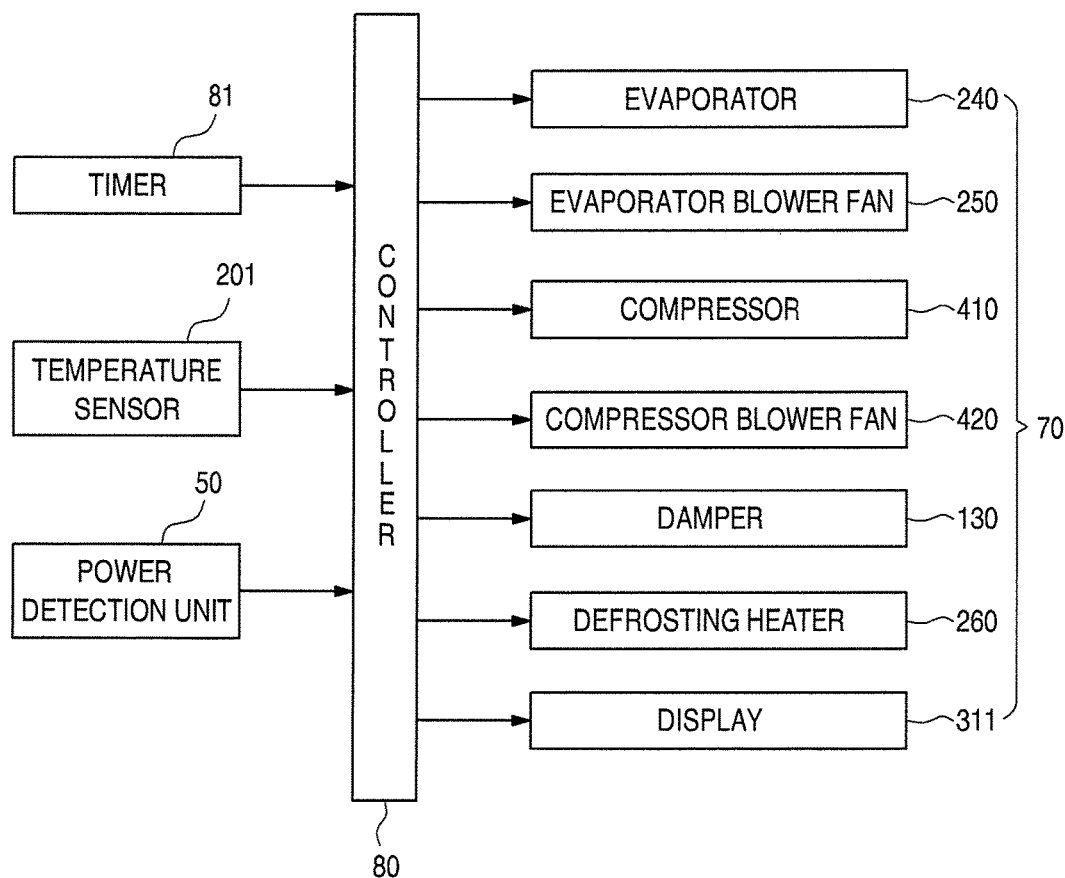
FIG. 4 is a block diagram illustrating a flow of a control signal of the refrigerator.

FIG. 3 is a schematic cross-sectional view illustrating an inner structure of the refrigerator. FIG. 4 is a block diagram illustrating a flow of a control signal of the refrigerator. The inside of the refrigerator body 10 may be vertically partitioned by a barrier 100 to form a freezing compartment 200 and a refrigerating compartment 300. Also, a machine room 400 may be provided in a lower portion of the refrigerator body 10. The refrigerating compartment 300 and the freezing compartment 200 may be opened or closed by a refrigerating compartment door 310 and a freezing compartment door 210, respectively. Also, the temperature of each of the refrigerating compartment 300 and the freezing compartment 200 may be controlled independently. For this, a temperature sensor 201 may be disposed in each of the refrigerating compartment 300 and the freezing compartment 200. Also, a display 311 may be disposed on the refrigerating compartment door 310 or the freezing compartment door 210. An operation state of the refrigerator 1 may be displayed on the display 311. Particularly, the display 311 may display a residual level of the battery 40 while the battery 40 is being charged or used. Thus, the user may control the operation of the refrigerator 1 according to the residual level of the battery 40.

A grill pan 220 may be disposed inside the freezing compartment 200, and a heat exchange compartment 230 partitioned by the grill pan 220 may be provided at a rear side of the freezing compartment 200. An evaporator 240 and an evaporator blower fan 250 may be disposed at a rear side of the grill pan 220 to transfer cool air generated in the evaporator 240 into the freezing compartment 200 via the grill pan 220. A defrosting heater 260 may be disposed on a side of the evaporator 240. When a defrosting operation is performed, the defrosting heater 260 may remove frost formed on the evaporator 240. Also, a defrosting water pan 270 for collecting defrosting water may be disposed under the evaporator 240. Also, a defrosting tube 271 may be connected to the defrosting pan 270 to drain the defrosting water into a drain pan 430 disposed within the machine room 400 that will be described below.

A storage space in which a plurality of shelves 320 and drawers 330 are disposed may be provided inside the refrigerating compartment 300. A cool air supply duct 340 communicating with the heat exchange compartment 230 to supply cool air into the refrigerating compartment 300 may be disposed in a rear wall of the refrigerating compartment 300.

A freezing compartment return duct 110 for collecting the cool air supplied into the freezing compartment 200 again into the heat exchange compartment 230 and a refrigerating compartment return duct 120 for collecting the cool air supplied into the refrigerating compartment 300 again into the heat exchange compartment 230 may be disposed inside the barrier 100.

A damper 130 for adjusting the supply of the cool air may be disposed in at least one of the freezing compartment return duct 110, the freezing compartment return duct 120, and the cool air supply duct 340. Thus, the supply of the cool air into the freezing compartment 200 and the refrigerating compartment 300 may be adjusted according to the operation of the damper 130 to control the temperature of each of the refrigerating compartment 300 and the freezing compartment 200.

Also, the machine room 400 may be provided in a rear side of the lower portion of the refrigerator body 10. The machine room 400 may be provided as a space that is independent from the refrigerating compartment 300. A compressor 410 and a condenser which constitute the refrigeration cycle and a compressor blower fan 420 may be disposed in the machine room 400. Also, a drain pan 430 for collecting the defrosting water discharged from the defrosting water tube 271 may be disposed on the bottom of the machine room 400.

The compressor 410 disposed inside the machine room 400 may use a BLDC (brushless direct current) compressor that is a variable displacement compressor. The rotation rate of the BLDC compressor may be adjusted to lower a power when the compressor 410 initially starts. Thus, a peak voltage when the compressor 410 initially starts may be lowered under the lower voltage to smoothly operate the compressor 410. Then, the rotation rate of the compressor may be varied according to a variation in a load to operate, and the compressor 41 may rotate at a preset rate according to an operation mode.

The controller 80 for controlling the driving unit 70 such as the compressor 410, the evaporator blower fan 250, the compressor blower fan 420, the damper 130, the defrosting heater 260, and the display 311 may be disposed in the refrigerator body 10. Also, a timer 81 for integrating times, the temperature sensor 201 for measuring an inner temperature of the refrigerator, and the power detection unit 50 may be connected to the controller 80. Thus, the controller 80 may determine the characteristics of the input power that is detected by the power detection unit 50 to control an operation of the driving unit 70 into a normal operation mode M100 or a power failure operation mode M200.

That is, when the power detection unit 50 detects a power failure state and signals the controller 80, the controller 80 may control an overall operation of the driving unit 70 by using values of the timer 81 and/or the temperature sensor 201 to operate in the power failure operation mode M200 that is in the low power state for generally reducing the power consumption.

Figure 5:
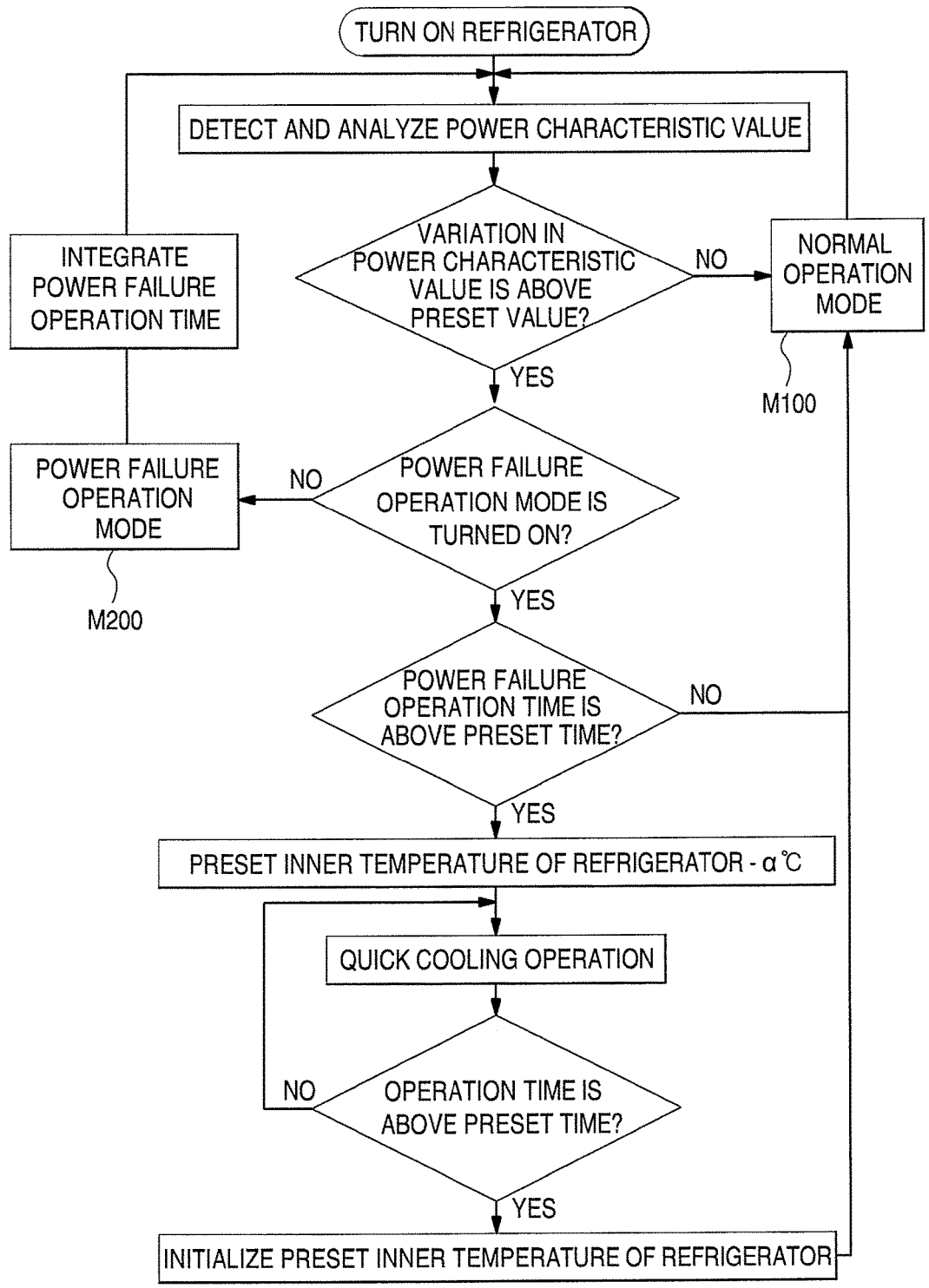
FIG. 5 is a flowchart illustrating an operation process of the refrigerator.

FIG. 5 is a flowchart illustrating an operation process of the refrigerator. In the refrigerator, when the refrigerator 1 is connected to the external power source 20, power may be supplied to the main body 10 through the commercial power supply unit 30 to turn on the refrigerator, in step S501. Thus, the driving unit 70 within the refrigerator body 10 may normally operate.

Here, the battery 40 may receive power from the external power source 20 through the commercial power supply unit 30 and charged. Thereafter, the battery 40 may be continuously charged as needed to maintain a fully charged state.

Also, the power supplied from the commercial power supply unit 30 may be analyzed in the power detection unit 50, in step S502. The power detection unit 50 may analyze the proper characteristics of the input power such as the voltage, the current, the frequency, and the frequency components of the input power. Then, the power detection unit 50 may determine whether the voltage inputted through the analysis process corresponds to the voltage of the external power source 20 or the battery 40, in step S503.

For example, the power detection unit 50 may operate in the normal operation mode M100 if the input current value is within a preset error range when compared to a preset input value, an input value just before the current is inputted, or an input value before a prescribed unit time.

In the normal operation mode M100, the driving unit 70 may operate based on a load placed on the refrigerator, and the input power through the external power source 20 may be maintained. In detail, the normal operation mode M100 may correspond to a normal operation of the refrigerator. Thus, in the normal operation mode M100, the driving unit 70 such as the compressor 410, the compressor blower fan 420, and the evaporator blower fan 250 may operate according to the inner temperature of the refrigerator, which is detected by the temperature sensor 201, and the inner temperature of the refrigerator may be maintained at a preset target temperature. Also, a defrosting operation may be performed according to a preset time schedule or sensed condition.

If the current value of the input power gets out of the preset error range when compared to the preset input value, the input value just before the current is inputted, or the input value before the unit time, the power detection unit 50 may determine that the power failure occurs, in step S503.

If the power detection unit 50 determines that the power failure occurs, the power of the battery 40 may be supplied by the power converter 60. Also, the power of the battery 40 may be supplied into the refrigerator body 10, and simultaneously, the driving unit 70 of the refrigerator body 10 may operate in a low-power operation state. Here, this state may be called a power failure operation mode M200.

Since the power of the battery 40 is inputted, but the power of the external power source is not inputted in the power failure operation mode M200, the operation of the driving unit 70 may be controlled so that a relatively a small amount of power is consumed. Thus, foods may be stored and maintained in the refrigerator by using only the battery 40.

If the prior state corresponds to the normal operation mode M100, but does not correspond to the power failure operation mode M200, the power failure operation mode M200 may be performed immediately, in step S510. When the change in the characteristics of the input power is detected in the power detection unit 50 while the power failure operation mode M200 is already performed, the power failure operation mode M200 may return to the normal operation mode M100, in step S512.

That is, when the power failure conditions are solved while the power failure operation mode M200 is performed, the power may be supplied from the external power source 20 into the commercial power supply unit 30, and also, the power may be supplied into the refrigerator body 10 through the commercial power supply unit 30.

Here, the characteristics of the input power may be analyzed in the power detection unit 50 to confirm that the power is inputted from the external power source 20, and not inputted from the battery 40, in step S503. When the power of the external power is supplied, the supply of the power of the battery 40 may be blocked in the power converter 60, and the battery 40 may be charged.

Thus, the above-described processes may be repeatedly performed to stably store the foods without spoiling even during power failures. In addition, the stored state of the foods may be maintained at a minimum power by using only the battery 40.

Before returning to the normal operation mode M100, when an operation time (operational duration) of the power failure operation mode M200 is greater than a preset time, as determined in step S504, the inner temperature of the refrigerator may be relatively high. Thus, a rapid cooling operation for quickly cooling the inside of the refrigerator may be needed before returning to the normal operation mode M100, in step S507.

For this, when the power failure operation mode M200 is finished, if the time of the power failure operation mode M200 that is calculated by the timer 81 is compared to the preset time, in step S505, and if it is determined that the time of the power failure operation mode M200 is greater than the preset time, a set-up temperature of the refrigerator may be lowered by a temperature of about α° C., in step S506. Here, the temperature of about α° C. may be determined in proportional to the elapsing time of the power fail operation mode M200. Here, the more the power failure operation mode M200 increases, the more the temperature value may increase.

Also, in this state, the driving unit 70 may operate to quickly cool the inside of the refrigerator (S507). Since the set-up temperature is less than an initially set temperature, the compressor 410 and the evaporator blower fan 250 may rotate at a high speed to perform the rapid cooling operation by which the inside of the refrigerator may be quickly cooled. The rapid cooling operation may be performed for a preset time. Here, the preset time may also increase or decrease in proportional to the temperature value of α° C.

When the rapid cooling operation is performed, the power supplied into the driving unit 70 may be supplied through the external power source 20. Also, when the rapid cooling operation is performed, the driving unit 70 may operate without being restricted by the power.

After the rapid cooling operation is performed for the preset time, in step S508, the set-up temperature of the refrigerator may be initialized to become to an initial set-up temperature, in step S509. In this state, the power failure operation mode M200 may return to the normal operation mode M100, in step S512.

In the power failure operation mode M200, the refrigerator may operate in the low-power operation state in which the consumed power is lower than that in the normal operation mode M100. In the power failure operation mode M200, the low-power operation state may be achieved through various methods. Hereinafter, various examples for realizing the power failure operation mode will be described.

Figure 6:
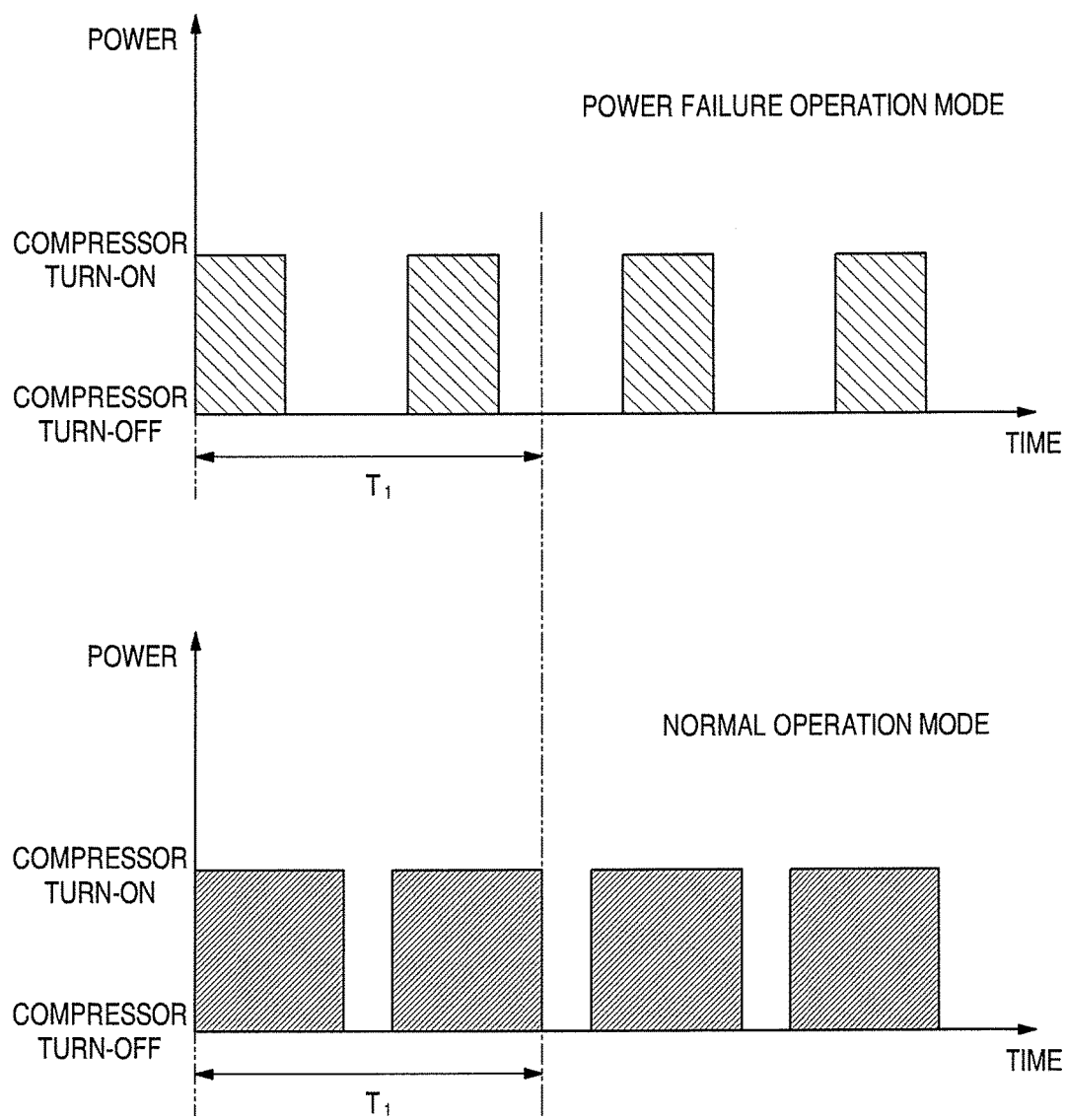
FIG. 6 is a graph illustrating a power failure operation mode of a refrigerator according to a first embodiment.

FIG. 6 is a graph illustrating a power failure operation mode of a refrigerator according to a first embodiment. An operation time (operational duration) of a compressor of the refrigerator according to time elapsed is illustrated by being divided into a normal operation mode and a power failure operation mode.

As illustrated in FIG. 6, in the normal operation mode M100, the compressor 410 may operate by a preset operation time (duration) within a unit time T1 to cool an inner space of the refrigerator. Also, in the power failure operation mode M200, the compressor 410 may operate by a preset operation time (duration) during the unit time T1. That is, in both the normal operation mode M100 and power failure operation mode M200, the compressor may be turned on and off for prescribed intervals. However, in the power failure operation mode M200, the compressor 410 may operate for a duration that is less than the preset operation time. That is, the operation time of the compressor 410 in the power failure operation mode M200 may decrease to be less than that of the compressor 410 in the power failure operation mode M200 for the same unit time T. Thus, the total power consumption in the power failure operation mode M200 may be reduced relative to that in the normal operation mode M100.

The operation time reduced in the power failure operation mode M200 when compared to that in the normal operation mode M100 may be variously set according to capacity of a battery 40 and also be variable during operation based on various other conditions such as sensed ambient or compartment temperatures, sensed load on the refrigerator/freezer compartments, or the like.

Figure 7:
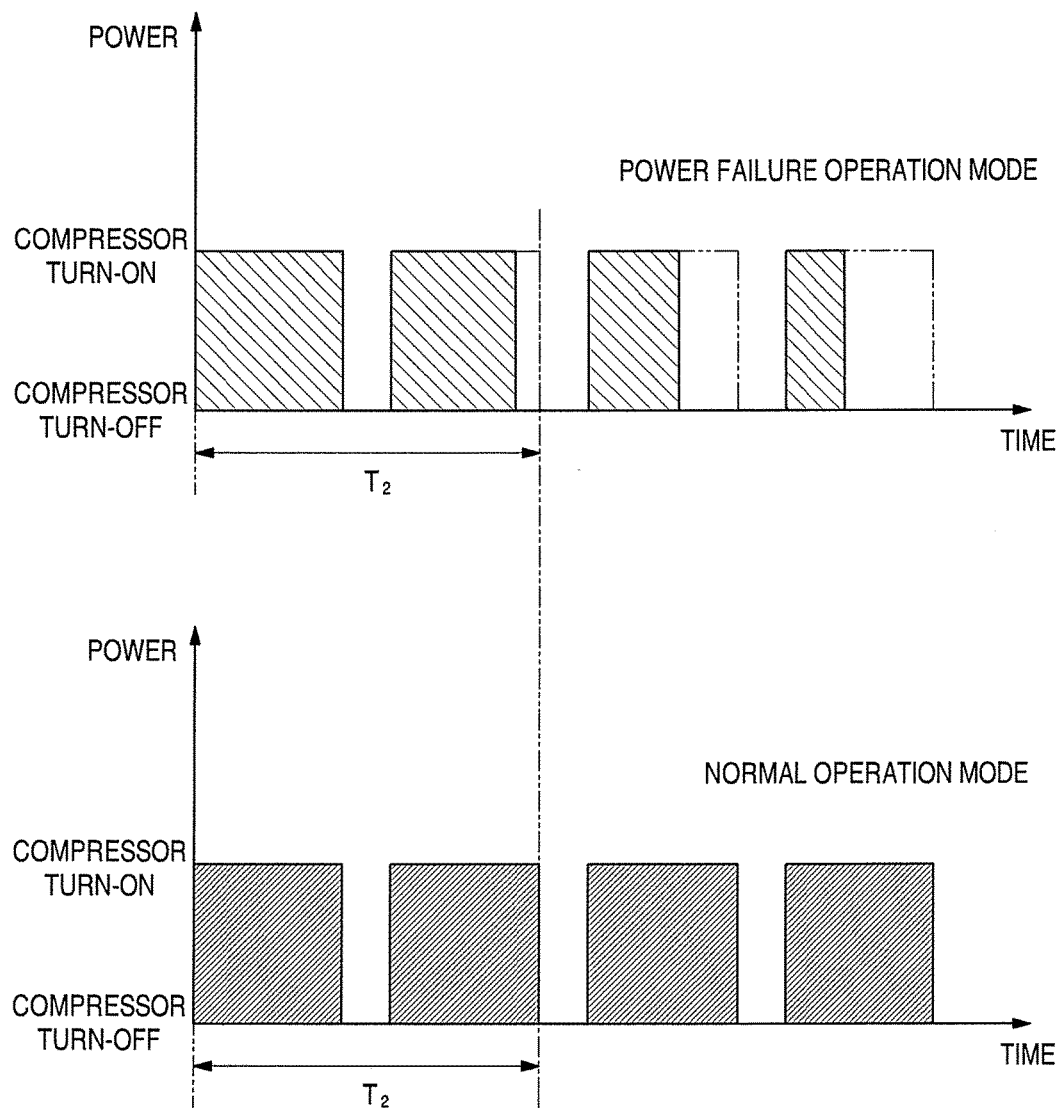
FIG. 7 is a graph illustrating a power failure operation mode of a refrigerator according to a second embodiment.

FIG. 7 is a graph illustrating a power failure operation mode of a refrigerator according to a second embodiment.

In FIG. 7, an operation time of a compressor according to time elapsing of the refrigerator is illustrated by being divided into a normal operation mode and a power failure operation mode.

As illustrated in FIG. 7, in the normal operation mode M100, the compressor 410 may operate by a preset operation time for a unit time T2 to cool an inner space of the refrigerator. Here, the compressor 410 may operate for the same time at the same time interval. That is, the operation times of the compressor 410 that operates at a predetermined time interval may be the same.

However, in the power failure operation mode M200, the compressor 410 may be repeatedly turned on/off for the unit time T2. As the time elapses, the operation time of the compressor 410 may be reduced. In detail, in the power failure operation mode M200, since the compressor 410 operates for the unit time T2, a 2nd operation time t2 may be reduced when compared to a 1st operation time t1. Also, a 3rd operation time t3 may be further reduced when compared to the 2nd operation time t2, and a 4$^{th}$ operation time t4 may be less than the 3$^{rd}$ operation time t3. That is, since the operation time of the compressor 410 is reduced, a dormant period in which the compressor 410 is turned again on after turned off may gradually increase.

As described above, since a power of a battery 40 is consumed while the operation time of the compressor 410 gradually decreases, the operation time of the compressor 410 may decrease to reduce the total power consumption.

Here, a 1st operation time of the compressor 410 may be the same as that in the normal operation mode M100. Also, as necessary, in the power failure operation mode M200, the 1st operation time of the compressor 410 may be decreased. Also, in the power failure operation mode M200, the operation time of the compressor 410 may linearly decrease. Also, when a preset time elapses, the operation time of the compressor 410 may be decreased further and be maintained.

Figure 8:
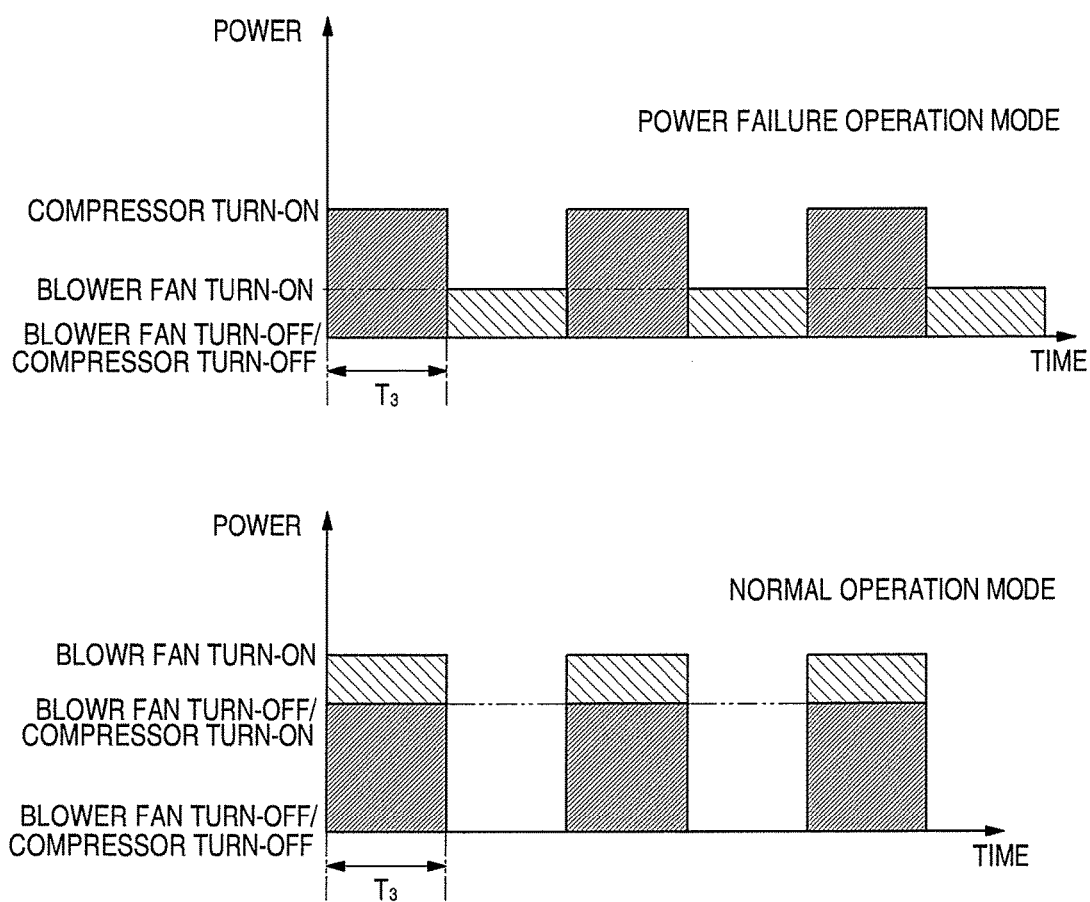
FIG. 8 is a graph illustrating a power failure operation mode of a refrigerator according to a third embodiment.

FIG. 8 is a graph illustrating a power failure operation mode of a refrigerator according to an embodiment. An operation time of a compressor and a blower fan according to time elapsing of the refrigerator is illustrated by being divided into a normal operation mode and a power failure operation mode.

In the normal operation mode M100, as necessary, when the compressor 410 operates, the compressor blower fan 420 and the evaporator blower fan 250 may operate together with each other. Here, the compressor 410, the compressor blower fan 420, and the evaporator blower fan 250 may operate together with each other for at least predetermined time. In the normal operation mode M100, since the compressor blower fan 420, and the evaporator blower fan 250 operate at the same time, a large amount of power per unit time T3 may be consumed. In particular, a maximum value of the consumed power may be related to performance of a battery 40 and be adjusted in the power failure operation mode M200.

In the power failure operation mode M200, while the compressor operates, operations of the compressor blower fan 420 and the evaporator blower fan 250 may be stopped. Also, while the compressor blower fan 420 and the evaporator blower fan 250 operate, the operation of the compressor 410 may be stopped. That is, the compressor blower fan 420 and the evaporator blower fan 250 may operate only when the compressor 410 does not operate to allow cool air to be circulated into the refrigerator.

Thus, in the power failure operation mode M200, since the compressor and the compressor and evaporator blower fans 420 and 250 do not operate at the same time, but alternately operate, an amount of consumed power may be distributed, and thus an amount of consumed power that is used for a unit time may decrease when compared to that in the normal operation mode M100. Particularly, a maximum or peak value of the used power may be further lowered.

As necessary, one of the compressor blower fan 420 and the evaporator blower fan 250 may operate together with the compressor 410 when the compressor 410 operates.

Figure 9:
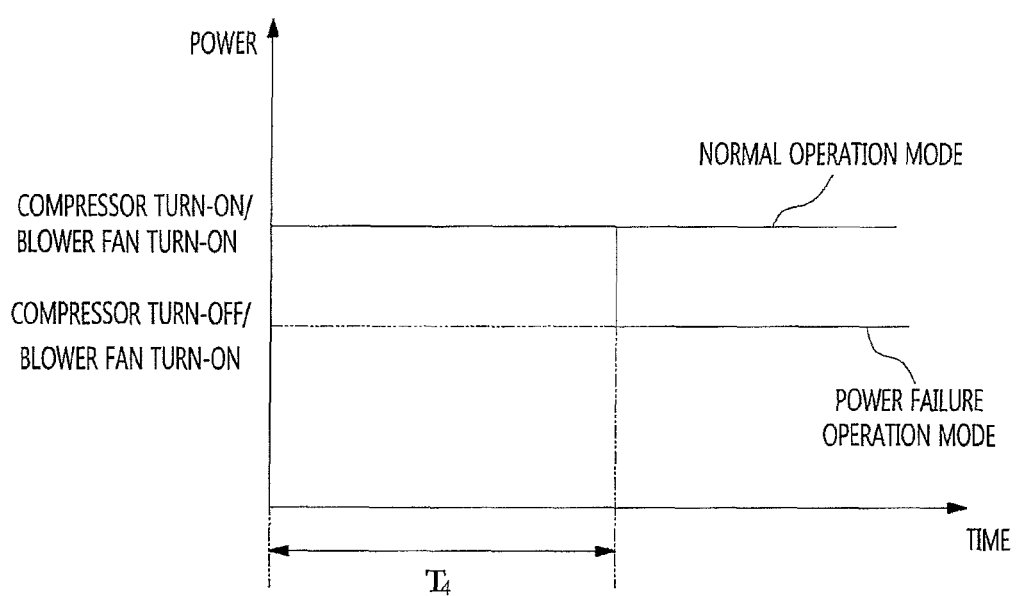
FIG. 9 is a graph illustrating a power failure operation mode of a refrigerator according to a fourth embodiment.

FIG. 9 is a graph illustrating a power failure operation mode of a refrigerator according to an embodiment. An operation time of a compressor and a blower fan according to time elapsing of the refrigerator is illustrated by being divided into a normal operation mode and a power failure operation mode.

In the normal operation mode M100, a compressor 410, a compressor blower fan 420, and an evaporator blower fan 250 may operate at the same time. Also, as a time elapses, the compressor 410, the compressor blower fan 420, and the evaporator blower fan 250 may continuously operate. Here, the compressor 410, the compressor blower fan 420, and the evaporator blower fan 250 may operate according to an inner temperature of the refrigerator, which is detected by a temperature sensor 201. When an operation for cooling the inside of the refrigerator is performed, the compressor 410, the compressor blower fan 420, and the evaporator blower fan 250 may operate at the same time.

In the power failure operation mode M200, the compressor 410 may operate until a preset time T4. After the preset time T4 elapses, the operation of the compressor 410 may be stopped, and only the evaporator blower fan 250 may operate to maintain the inner temperature of the refrigerator.

Here, the compressor blower fan 420 and the compressor 410 may be linked with each other to operate at the same time. Also, while the compressor 410 operates, the compressor blower fan 420 may operate to release heat of the compressor 410. Also, if the operation of the compressor 410 is stopped, and thus, it is unnecessary to release the heat of the compressor 410, the operation of the compressor blower fan 420 may be stopped.

Also, in the power failure operation mode M200, the compressor 410 may be turned on/off according to the inner temperature of the refrigerator before the preset time T4 elapses to maintain the inner temperature of the refrigerator. Then, after the preset time T4 elapses, the compressor 410 may not operate any more regardless of the inner temperature of the refrigerator, and only the evaporator blower fan 250 may operate.

Here, the preset time T4 may be determined according to residual capacity of a battery 40. The compressor 410, the compressor blower fan 420, and the evaporator blower fan 250 may operate at an initial time at which the residual capacity of the battery 40 is relatively large so that sufficient cooling performance is exerted.

Thus, since only the evaporator blower fan 250 operates to significantly reduce power consumption at the latter half time at which the residual capacity of the battery 40 is relatively low, minimum cooling performance may be maintained for a longer period of time by using only the power of the battery 40.

Figure 10:
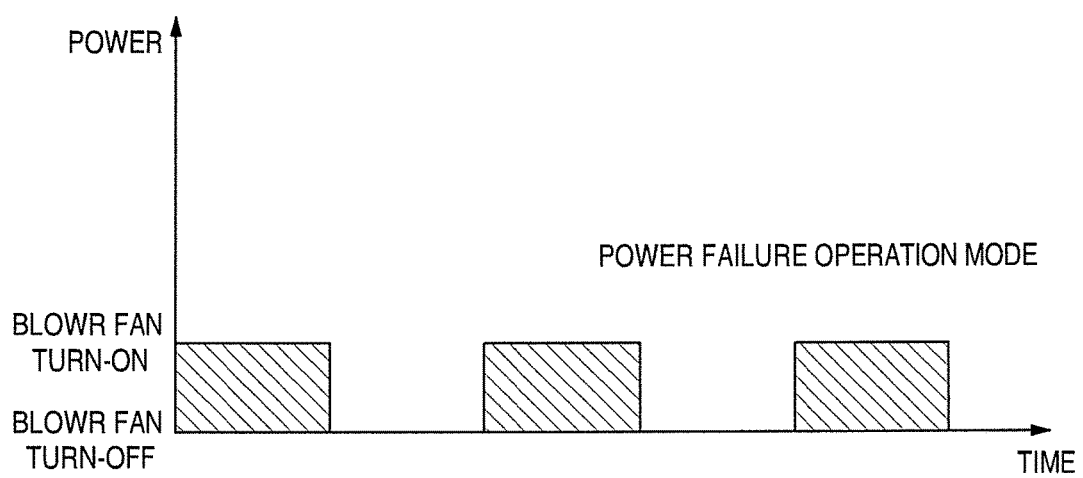
FIG. 10 is a graph illustrating a power failure operation mode of a refrigerator according to a fifth embodiment.
Figure 10:
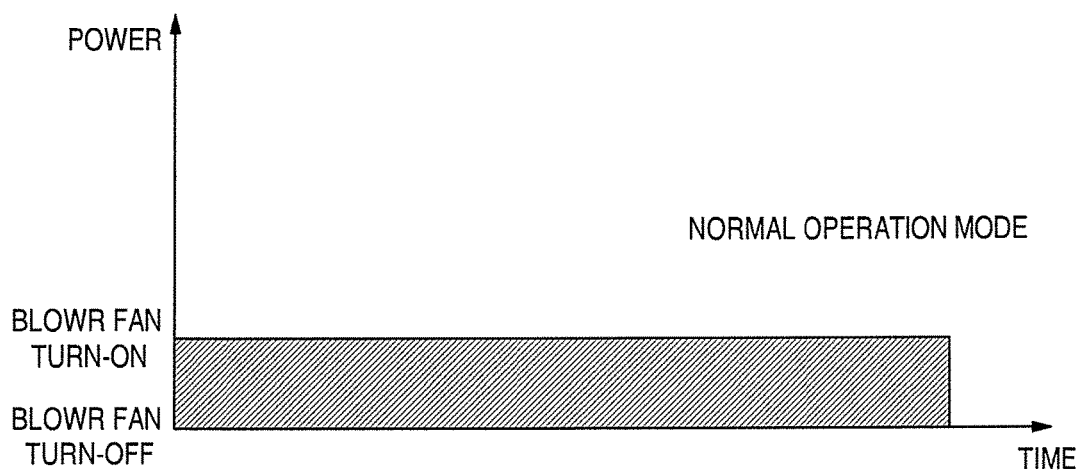

FIG. 10 is a graph illustrating a power failure operation mode of a refrigerator according to an embodiment. Here, an operation time of a blower fan according to time elapsing of the refrigerator is illustrated by being divided into a normal operation mode and a power failure operation mode.

In the normal operation mode M100, the evaporator blower fan 250 may continuously constantly operate as a time elapses. Here, the evaporator blower fan 250 may operate according to an inner temperature of the refrigerator, which is detected by a temperature sensor 201. That is, when an operation for cooling the inside of the refrigerator is performed, the evaporator blower fan 250 may continuously operate regardless of the time elapsing until the inner temperature of the refrigerator reaches a preset temperature. When the inner temperature of the refrigerator reaches the preset temperature, the evaporator blower fan 250 may be turned off.

In the power failure operation mode M200, the evaporator blower fan 250 may operate. Here, the operation and stopping of the evaporator blower fan 250 may be repeated for a predetermined time. Also, the operation of the evaporator blower fan 250 may be determined according to the inner temperature of the refrigerator, which is detected by a temperature sensor 201. Here, the evaporator blower fan 250 may be repeatedly turned on/off at a predetermined time interval until the inner temperature of the refrigerator reaches the preset temperature.

Thus, in the power failure operation mode M200, the total operation time of the evaporator blower fan 250 may decrease to reduce the power consumption. Also, the inner temperature of the refrigerator may be maintained to the minimized cooling temperature when using power from the battery 40.

Figure 11:
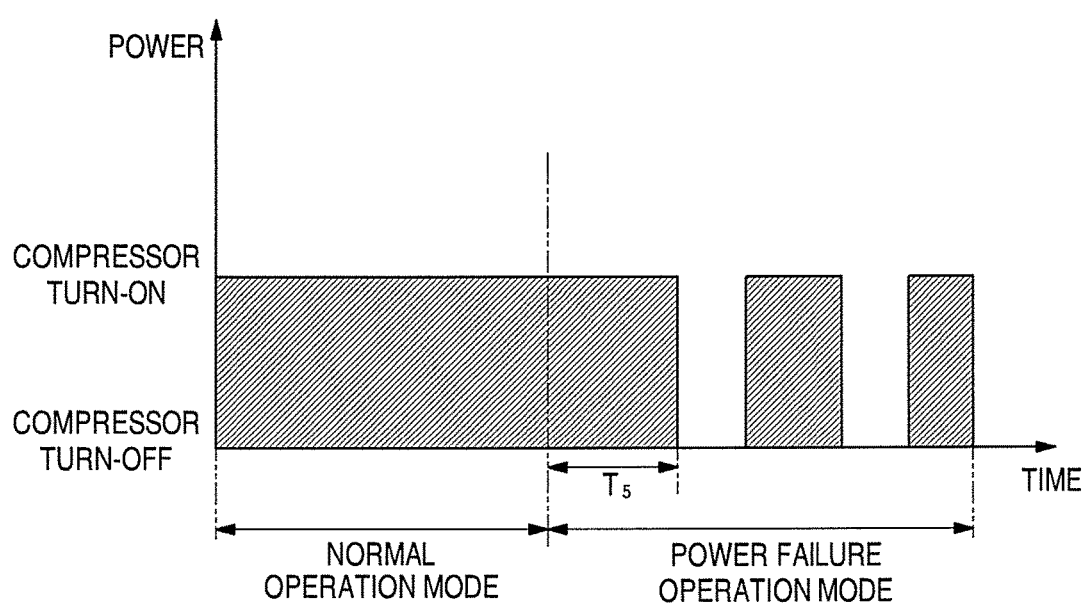
FIG. 11 is a graph illustrating a power failure operation mode of a refrigerator according to a sixth embodiment.

FIG. 11 is a graph illustrating a power failure operation mode of a refrigerator according to an embodiment. In FIG. 11, an operation time of a compressor according to time elapsing of the refrigerator is illustrated by being divided into a normal operation mode and a power failure operation mode.

In the normal operation mode M100, the compressor 410 may continuously operates to cool the inside of the refrigerator. Here, the compressor 410 may operate according to an inner temperature of the refrigerator, which is detected by a temperature sensor 202. When the inner temperature of the refrigerator is above a preset temperature, the compressor 410 may be turned on, and when the inner temperature of the refrigerator satisfies the preset temperature, the compressor 410 may be turned off. Thus, the operation of the compressor 410 may be continuously maintained under the operation conditions of the compressor 410.

In the power failure operation mode M200, the compressor 410 may be turned on at an initial time according to the inner temperature of the refrigerator, like the normal operation mode M100. Then, the turn-on of the compressor 410 may be maintained until the inner temperature of the refrigerator is satisfied.

Also, in the power failure operation mode M200, when a preset time T5 elapses, the compressor 410 may be repeatedly turned on/off at a predetermined time interval regardless of the inner temperature of the refrigerator, which is detected by a temperature sensor 201.

That is, after a preset time at which residual capacity of a battery 40 reaches a preset value, the operation of the compressor 410 may be repeatedly performed or stopped for a predetermined time to maintain the cooling state for the predetermined time by using the residual capacity of the battery 40.

Figure 12:
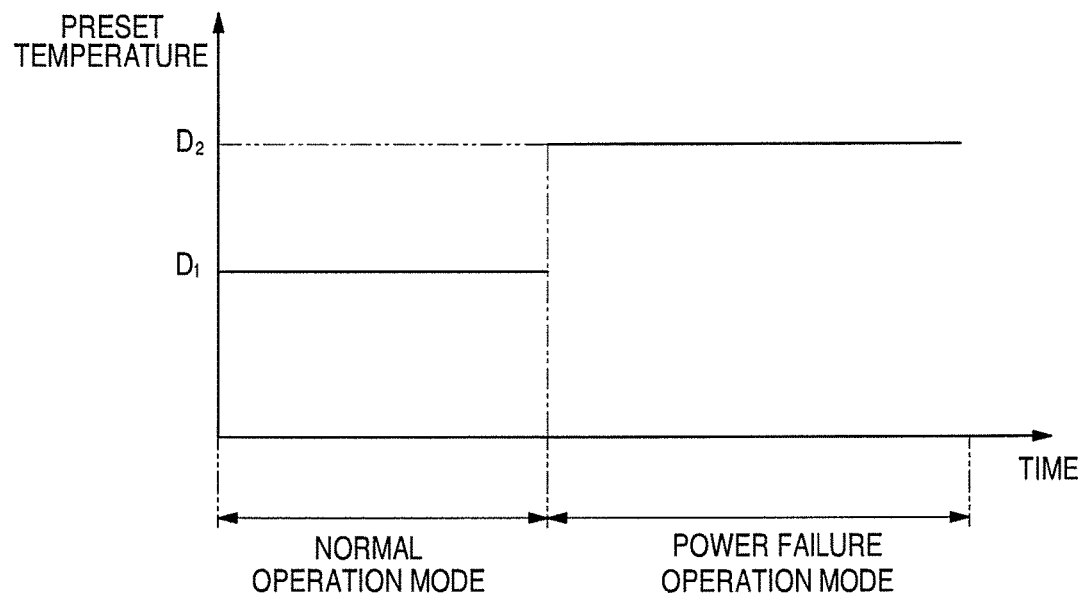
FIG. 12 is a graph illustrating a power failure operation mode of a refrigerator according to a seventh embodiment.
Figure 12:
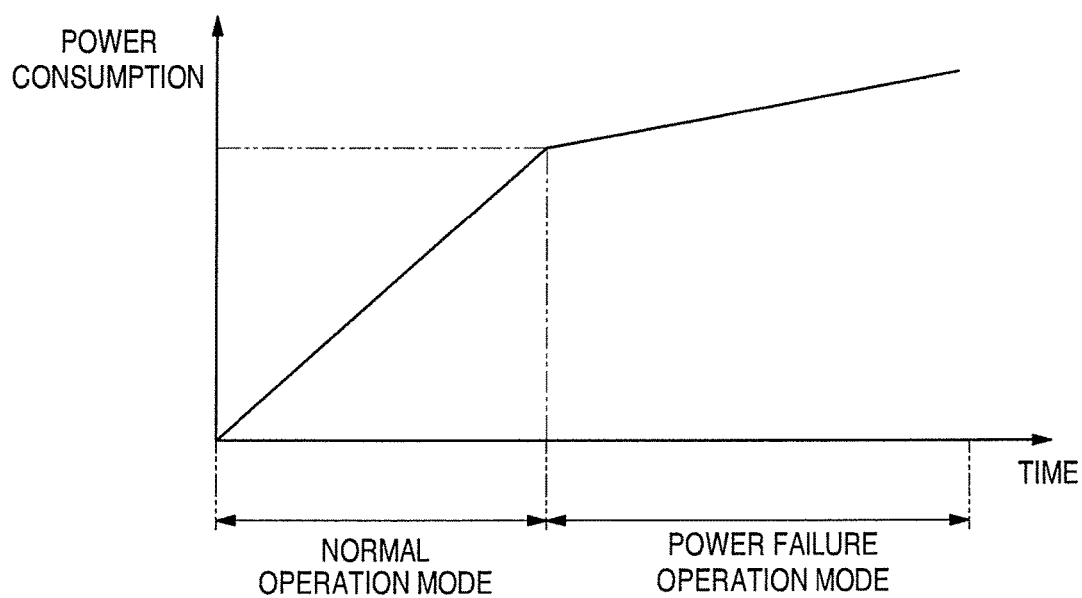

FIG. 12 is a graph illustrating a power failure operation mode of a refrigerator according to an embodiment. FIG. 12 illustrates variations in preset temperature and power consumption according to time elapsing of the refrigerator.

A preset inner temperature D1 of the refrigerator 1 may be maintained in a normal operation mode M100. For this, a driving unit 70 may operate. Thus, in the normal operation mode M100, it is seen that the power consumption gradually increases as a time elapses.

When power supplied into the refrigerator 1 is switched to power from a battery 40, the normal operation mode M100 may be converted into a power failure operation mode M200. Here, the preset temperature D2 may be greater than that D1 in the normal operation mode M100. Thus, since the driving unit 70 operates on the basis of the preset temperature D2 that is a relatively high, a gradient of the power consumption in the power failure operation mode M200 may be lower than that of the power consumption in the normal operation mode M100.

That is, in the power failure operation mode M200, the operation number or time of the driving unit 70 may be reduced. Thus, the power consumption may be significantly reduced to maintain the minimum cooling performance for a sufficient time by using the power of the battery 40.

Figure 13:
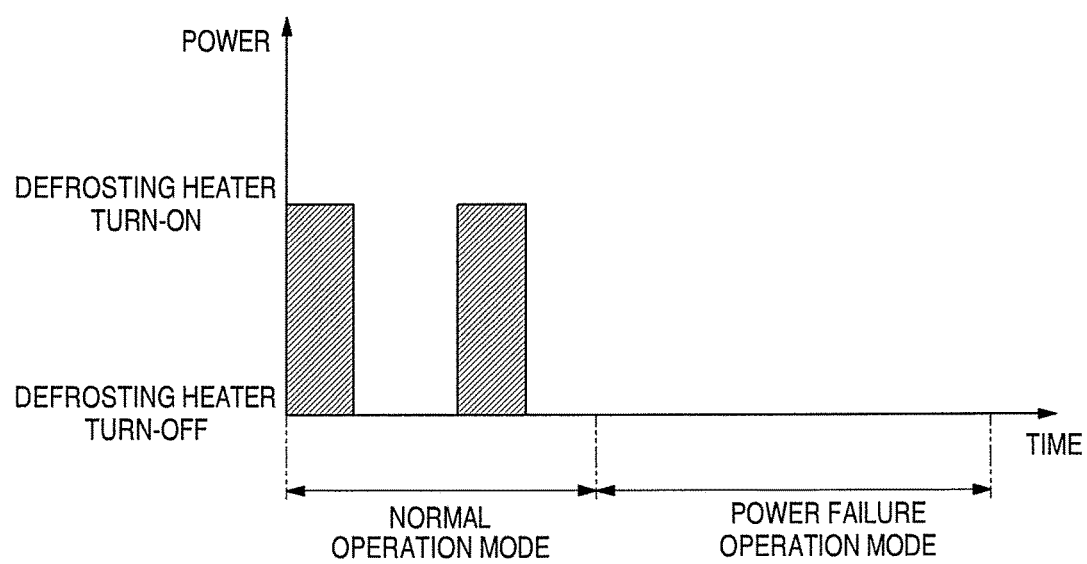
FIG. 13 is a graph illustrating a power failure operation mode of a refrigerator according to an eighth embodiment.

FIG. 13 is a graph illustrating a power failure operation mode of a refrigerator according to an embodiment, and illustrates an operation of a defrosting heater according to time elapsing of the refrigerator. In a normal operation mode M100, when a defrosting operation signal is inputted, the defrosting heater 260 may operate to perform a defrosting operation. When the defrosting operation is performed, the defrosting heater 260 and an evaporator blower fan 250 may operate, and an operation of a compressor 410 may be stopped.

In the normal operation mode M100, since a power of an external power source is continuously supplied, a power for performing the defrosting operation such as the operation of the defrosting heater 260 may be sufficiently supplied. Thus, the defrosting operation may be limitlessly performed.

In a power failure operation mode M200, even though the defrosting signal is inputted, the defrosting heater 260 may not operate. Also, other parts such as an evaporator blower fan 250 and a damper 130, which operate during the defrosting operation, may not operate to omit the defrosting operation itself.

As described above, the omission of the defrosting operation may be forcibly performed because of the limitation in supply of battery power that is supplied from a battery 40. That is, the defrosting operation may be omitted so as to restrict the operation of the defrosting heater 260 that consumes a relatively large amount of power and prevent a lower within the refrigerator from increasing due to the defrosting operation. Thus, in the power failure operation mode, the power consumption may be minimized to continuously perform cooling of the inside of the refrigerator by using the power of the battery 40.

The refrigerator according to the embodiments may have various structures in addition to the above-described structures. For example, a cool storage unit (or thermal storage unit) and a blower fan for blowing cool air generated in the cool storage unit may be disposed on a side of a freezing compartment. When power failure occurs, the refrigerator may operate in a power failure operation mode.

The refrigerator according to another embodiment may further include the cool storage unit and the blower fan. Thus, since the refrigerator is the same as that according to the foregoing embodiments except for the cool stage unit and the blower fan, the same part will be designated by the same reference numeral and detailed descriptions thereof will be omitted.

Figure 14:
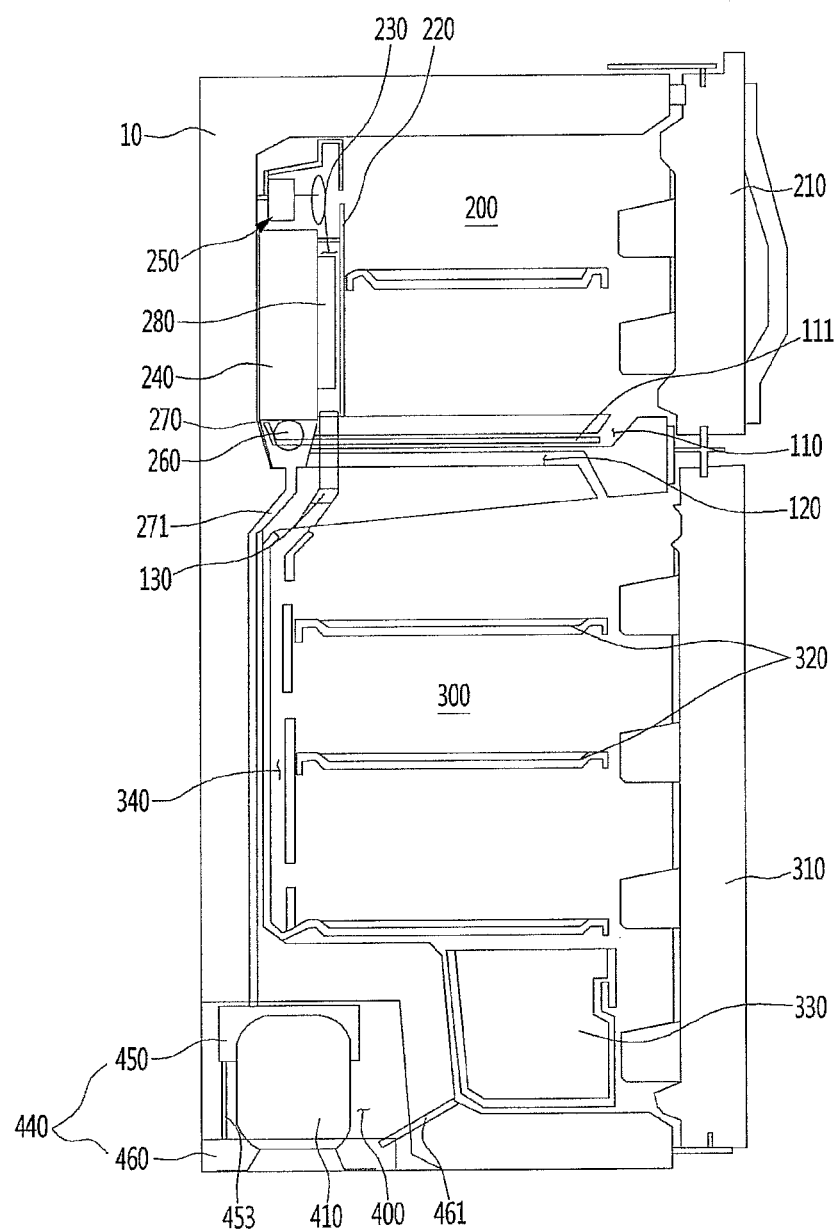
FIG. 14 is a side cross-sectional view of a refrigerator according to another embodiment.
Figure 15:
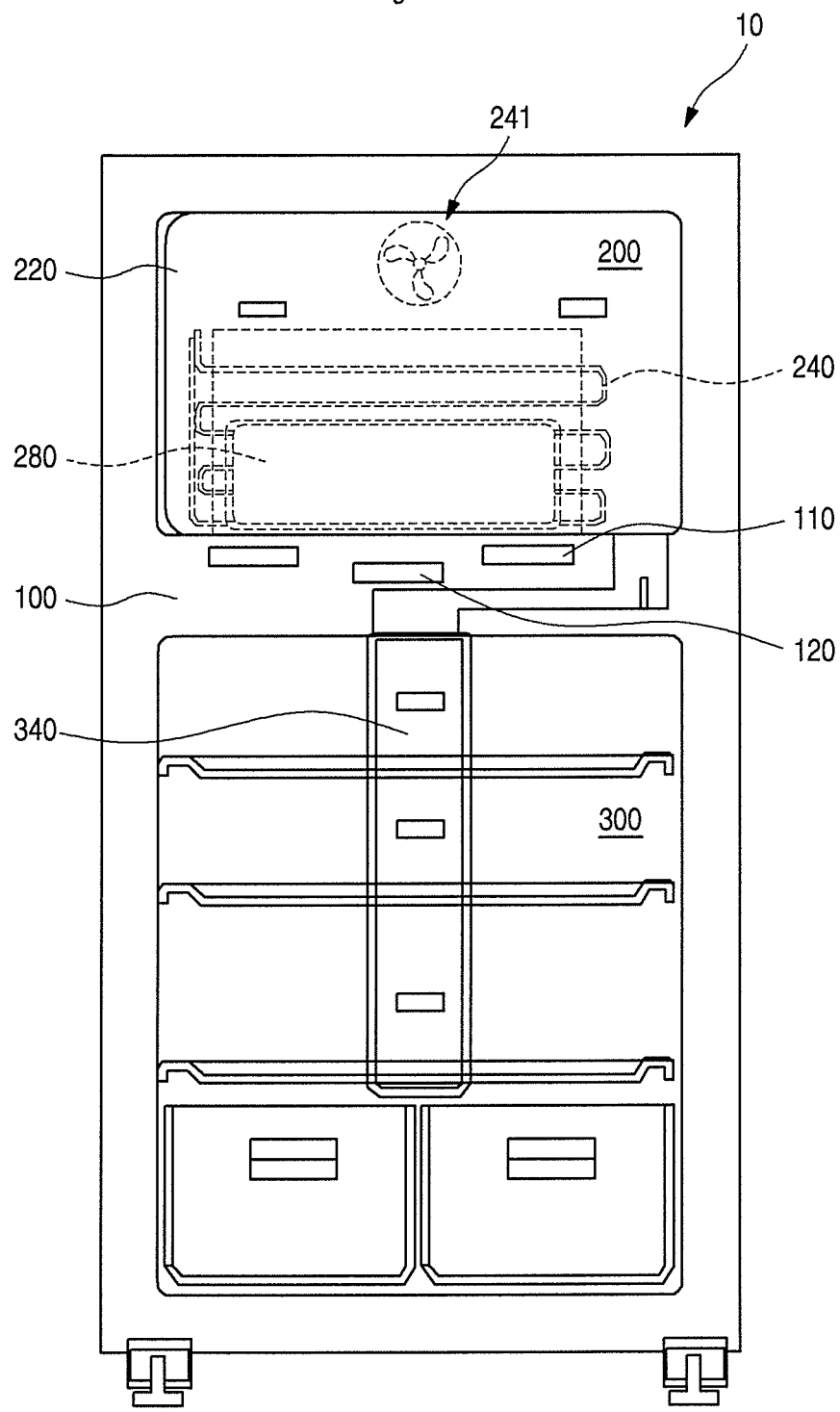
FIG. 15 is a front view of the inside of the refrigerator.

FIG. 14 is a side cross-sectional view of a refrigerator according to another embodiment. FIG. 15 is a front view of the inside of the refrigerator. A refrigerator 1 according to another embodiment may include a main body 10 that is partitioned into a refrigerating compartment 300 and a freezing compartment 200 by a barrier 100 and a refrigerating compartment door 310 and freezing compartment door 210, which respectively open or close the refrigerating compartment 300 and freezing compartment 200.

Also, a heat exchange compartment 230 may be defined in a rear side of the freezing compartment 200 by a grill pan 220 disposed in a rear wall of the freezing compartment 200. Also, an evaporator 240 and a blower fan 241 may be disposed inside the heat exchange compartment 230. One blower fan 241 may forcibly blow cool air that is generated in an evaporator and a cool storage pack 280.

The cool storage pack 280 may be disposed in the heat exchange compartment 230. The cool storage pack 280 may store heat due to an inner temperature of the refrigerator while the evaporator 240 operates and then discharge the stored cool air in a state where it is impossible to cool the inside of the refrigerator by using the evaporator 240 due to power failure to cool the inside of the refrigerator.

The cool storage pack 280 may include a liquid material that is changeable in phase at the inner temperature of the refrigerator or a solid material that corresponds to the liquid material. For example, an eutectic salt that is an eutectic mixture or a metal having high thermal conductivity and specific heat may be used as the cool storage pack 280 so that the cool storage pack 280 has a low melting point.

The cool storage pack 280 may be disposed at a position at which the cool storage pack 280 is easily cooled, and the stored cool air is easily discharged. Thus, the cool storage pack 280 may be disposed in an inner wall of the freezing compartment. Also, to more effectively cool the cool storage pack 280, the cool storage pack 280 may be disposed inside the heat exchange compartment 230. Alternatively, the cool storage pack 280 may contact the evaporator 240.

As illustrated in FIG. 14, the cool storage pack 280 may be disposed to contact a front surface of the evaporator 240. Also, the cool storage pack 280 may be disposed on a passage defined between the evaporator 240 and the grill fan 220.

Thus, the cool storage pack 280 may be disposed at an outlet-side of a freezing compartment return duct 110 so that the cool air collected into the freezing compartment 200 is cooled while passing again through the cool storage pack 280, and then is discharged again into the freezing compartment 200.

The cool storage pack 280 may be disposed between the evaporator 240 and a grill pan 220. A blower fan 241 may be disposed above the cool storage pack 280 to blow cooled air into the freezing compartment 200 when the blower fan 241 operates.

A defrosting heater 260 may be disposed on a side of the evaporator 240. A defrosting pan 270 for collecting defrosting water and a defrosting tube 271 may be disposed under the evaporator 240 to drain the defrosting water into a drain pan 440 disposed inside a machine room 400.

A plurality of shelves 320 and drawers 330 and a cool air supply duct 340 may be disposed inside the refrigerating compartment 300. A freezing compartment return duct 110 and the refrigerating return duct 120 may be disposed inside the barrier 100. Also, a damper 130 may be disposed in at least one of the freezing compartment return duct 110, the refrigerating compartment return duct 120, and the cool air supply duct 340. Also, a compressor 410, a condenser, a compressor blower fan 420, and a drain pan 440 may be disposed in the machine room 400.

A frost attachment inducing plate 111 may be disposed inside the freezing compartment return duct 110 that defines a passage through which the air within the freezing compartment returns to the heat exchange compartment 230. The frost attachment inducing plate 111 may induce attachment of moisture generated in the refrigerator thereon. Also, the frost attachment inducing plate 111 may be disposed on an air flow passage of the freezing compartment 200 so that the moisture may be more easily attached.

The frost attachment inducing plate 111 may be formed of a metal material having high thermal conductivity such as aluminum. The frost attachment inducing plate 111 may be disposed to contact the evaporator 240 and thus be cooled together with the evaporator 240 when the evaporator 240 is cooled.

Also, the frost attachment inducing plate 111 may be inclined. Here, an inclined end of the frost attachment inducing plate 111 may be disposed in the defrosting water pan 270. Thus, the frost attached to the frost attachment inducing plate 111 may be melted during the defrosting operation and then be collected into the defrosting pan 270.

Then, the defrosting water may be discharged into the machine room 400 through the defrosting water tube 271.

Figure 16:
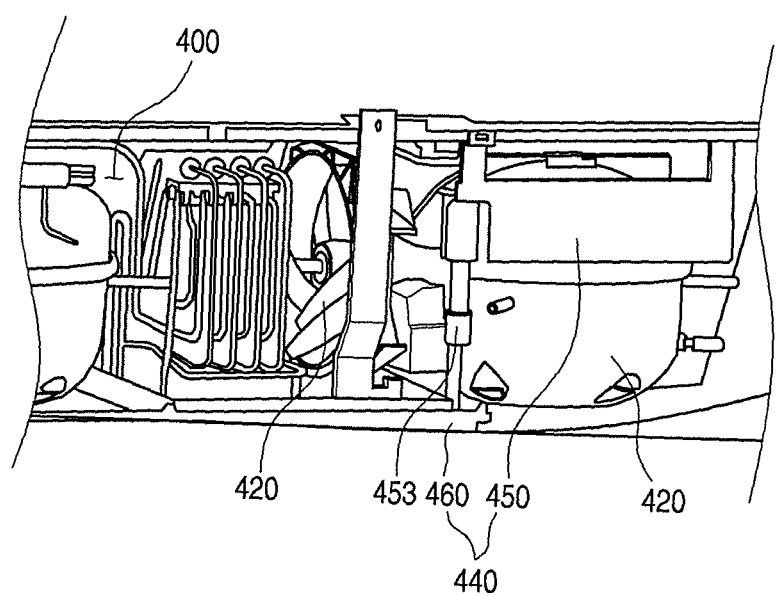
FIG. 16 is a perspective view of the inside of a machinery room of the refrigerator.
Figure 17:
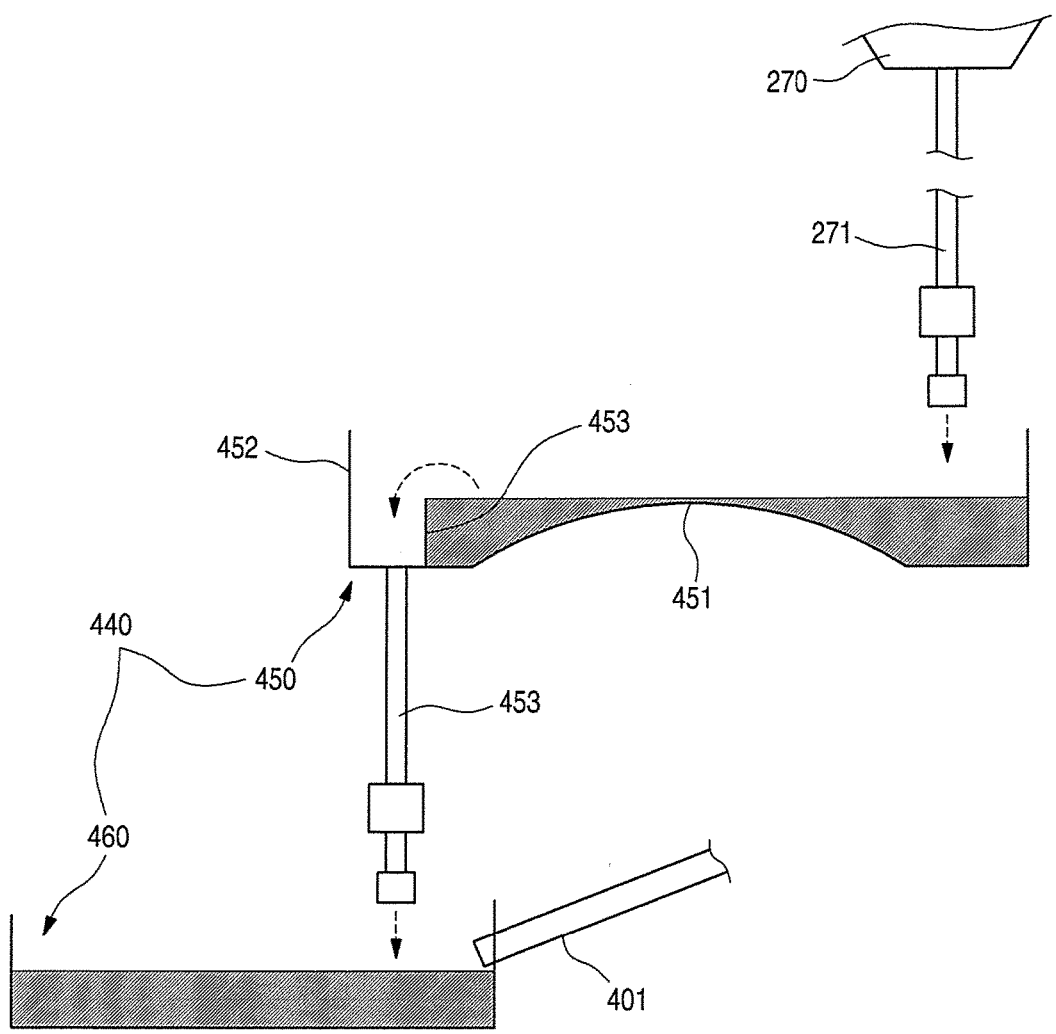
FIG. 17 is a schematic view illustrating a flow of defrosting water in the refrigerator.

The drain pan 440 may be provided in plurality. Hereinafter, the drain pan 440 will be described in more detail. FIG. 16 is a perspective view of the inside of the machinery room of the refrigerator. FIG. 17 is a schematic view illustrating a flow of the defrosting water in the refrigerator. The drain pan 440 disposed in the machine room 400 may include a first evaporation dish 450 and a second evaporation dish 460. The first evaporation dish 450 may be seated on a top surface of the compressor 410 so that the water collected into the defrosting water fan 270 is supplied through the defrosting water tube 271.

For this, a seat part 451 protruding upward from a central portion of the first evaporation dish 450 is disposed on the first evaporation dish 450 so that the top surface of the compressor 410 is seated. Also, for this, the seat part 451 may have a shape corresponding to that of the top surface of the compressor 410 so that an entire top surface of the compressor 410 is accommodated into the seat part 451.

Thus, the top surface of the compressor 410 may stably surface-contact a bottom surface of the first evaporation dish 450. Also, the water collected into the second evaporation dish 460 may be heated and evaporated by the heat generated through the operation of the compressor 410.

Also, a border 452 may be disposed around the first evaporation dish 450. The border 452 may define a space, in which the water is collected, inside of the first evaporation dish 450 and have a predetermined height. Thus, the water collected into the defrosting water pan 270 may be stably received into the first evaporation dish 450.

The second evaporation dish 460 may be disposed on the bottom of the machine room 400 or under the first evaporation dish 450. The second evaporation dish 460 may connected to a second connection tube 461 communicating with the bottom of the refrigerator to receive the water collected onto the bottom of the refrigerator. Thus, the water generated in the refrigerator and then collected onto the bottom of the refrigerator may be collected into the second evaporation dish 460 through the second connection tube 461.

The second evaporation dish 460 may be disposed under the first evaporation dish 450 and have a size greater than that of the second evaporation dish 460. Also, the first evaporation dish 450 and the second evaporation dish 460 may be connected to each other through the first connection tube 453. Thus, if a predetermined amount or more of water is collected into the first evaporation dish 450, the water within the first evaporation dish 450 may flow into the second evaporation dish 460 through the first connection tube 453.

In detail, an upper end of the first connection tube 453 may communicate with a bottom of the first evaporation dish 450 and be disposed in an inner space of a partition wall 454 that partitions the first evaporation dish 450. Also, the partition wall 454 may partition the first evaporation dish 450 and have a height slightly less than that of the border 452. Also, a lower end of the first connection tube 453 may be opened upward from the second evaporation dish 460. Thus, a portion of the water collected into the first evaporation dish 450 may flow into the second evaporation dish 460.

Thus, if an amount of water collected into the first evaporation dish 450 is greater than a preset amount of water, a portion of the collected water may flow over the partition wall 454. The water overflowing the partition wall 454 may flow into the second evaporation dish 460 through the first connection tube 453.

Thus, even though a large amount of water is generated while the defrosting operation is performed, the water may not irregularly overflow the first evaporation dish 450. Thus, the first evaporation dish 450 may be maintained at a predetermined water level.

Figure 18:
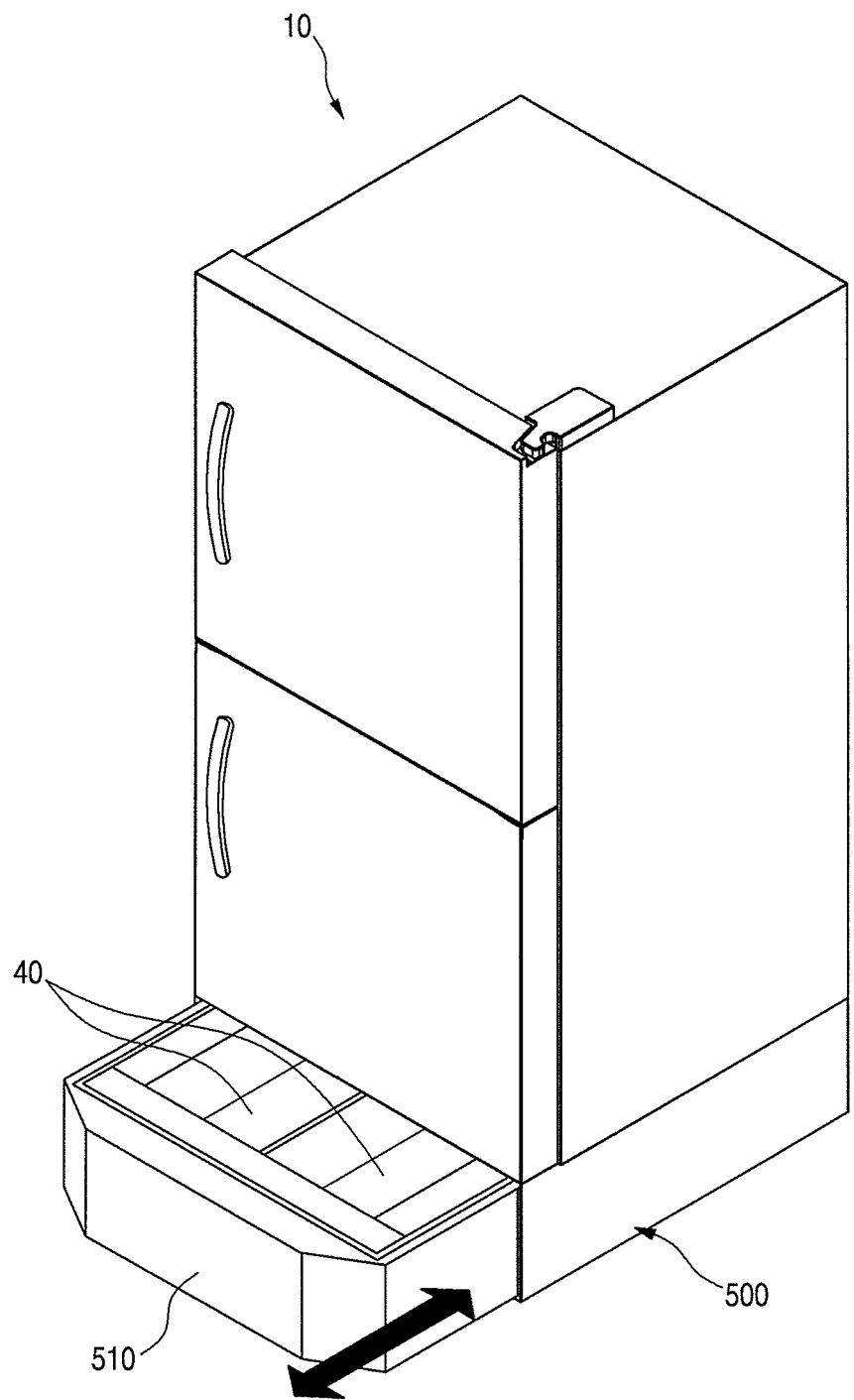
FIG. 18 is a perspective view illustrating a state in which a drawer disposed in a lower portion of the refrigerator is opened.

FIG. 18 is a perspective view illustrating a state in which a drawer disposed in a lower portion of the refrigerator is opened. A case 500 on which at least one of a battery 40, a power detection unit 50, and a power converter 60 is mounted may be disposed at a lower portion of the main body 10 of the refrigerator. Thus, the battery 40, the power detection unit 50, the power converter 60 may be disposed inside the case 500 and then connected to the main body 10. The refrigerator may operate in a normal operation mode M100 in which the refrigerator is connected to a commercial power supply unit 30 disposed outside the main body 10 of the refrigerator to receive a power from an external power source 20 and a power failure operation mode M200 in which a power of the battery 40 is supplied from the battery 40.

Also, a drawer 510 that is inserted into or withdrawn from a case 500 and has an accommodation space therein may be further provided in the case 500. The battery 40 may be mounted inside the drawer 510. Thus, the battery 40 may be replaced or charged by detaching the battery 40 or the drawer 510.

The refrigerator including the above-described constitutions may operate according to the foregoing embodiments. However, the current embodiment is different from the foregoing embodiments except for a power failure operation mode in which the refrigerator operates by using a power of a battery when power failure occurs. Hereinafter, the power failure operation method will be described.

Figure 19:
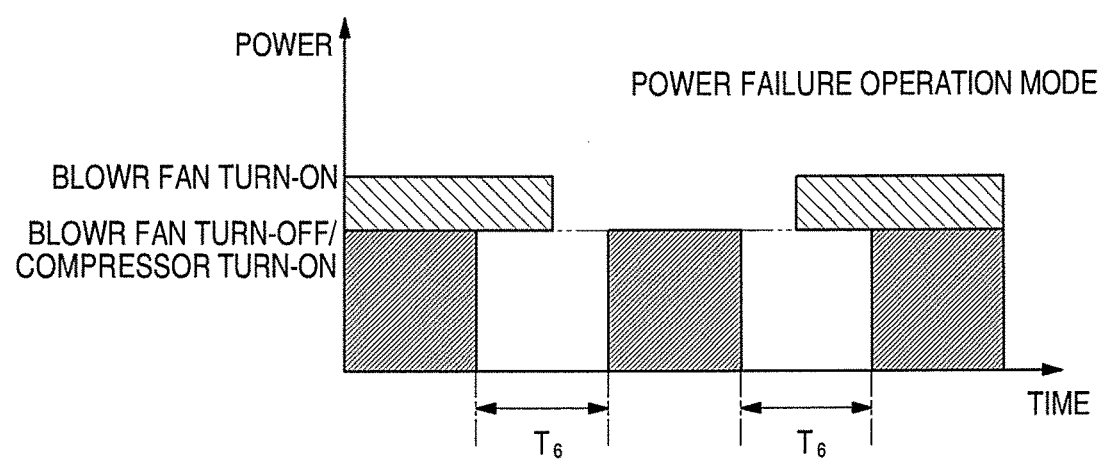
FIG. 19 is a graph illustrating a power failure operation mode of a refrigerator according to a ninth embodiment.

FIG. 19 is a graph illustrating a power failure operation mode of a refrigerator, and illustrates operations of a compressor and a blower fan according to time elapsing of the refrigerator. In the power failure operation mode M200, the compressor 410 may be continuously turned on/off at a preset time interval. Here, the operation of the compressor 410 may be repeatedly turned on/off at only a preset time interval T6 regardless of an inner temperature of the refrigerator. Also, the compressor 410 may operate only for a time that is less than that of the compressor 410 in the normal operation mode M100.

The compressor 410 operating in the power failure operation mode M200 may remove moisture generated in the refrigerator. Here, a period in which it is predicted to generate moisture may be set to a preset time. When the preset time is set, the compressor 410 may operate at the preset time.

Thus, the compressor 410 may operate at the preset time interval T6 to fundamentally prevent moisture from occurring due to increase in inner temperature of the refrigerator. Since the moisture is removed, it may prevent frost from occurring in the refrigerator, and also attachment or generation of the frost may be induced using the frost attachment inducing plate 111.

The inner temperature of the refrigerator may be adjusted by the blower fan 241. The blower fan 241 may operate to forcibly supply air cooled by the cool storage pack 260 into the refrigerator, thereby cooling the inside of the refrigerator. Here, the blower fan 241 may operate according to the inner temperature of the refrigerator, which is measured by the temperature sensor 201. Thus, the blower fan 241 may independently operate with respect to the operation of the compressor 410. That is, when the inner temperature of the refrigerator is above the preset temperature, the blower fan 241 may blow the air cooled by the cool storage pack 280 into the refrigerator to lower the inner temperature of the refrigerator. Then, when the inner temperature of the refrigerator reaches the preset temperature, the operation of the blower fan 241 may be stopped. Of course, the preset inner temperature of the refrigerator may be greater than the inner temperature of the refrigerator in the normal operation mode.

Figure 20:
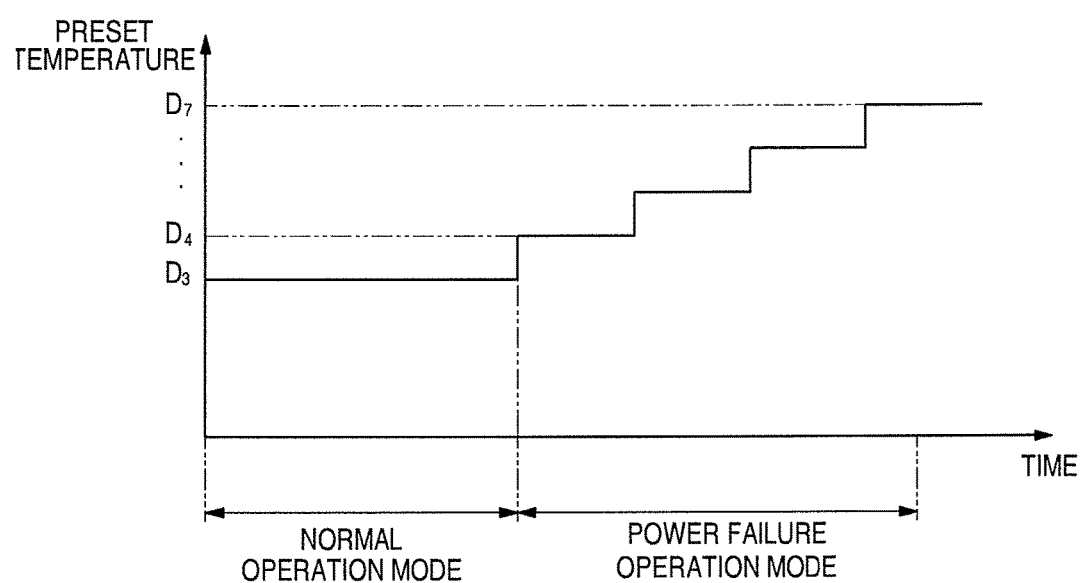
FIG. 20 is a graph illustrating a power failure operation mode of a refrigerator according to a tenth embodiment.

FIG. 20 is a graph illustrating a power failure operation mode of the refrigerator according to an tenth embodiment. An operation time of a blower fan according to time elapsing of the refrigerator is illustrated as being divided into a normal operation mode and a power failure operation mode. The inside of the refrigerator 1 may be maintained to a preset temperature D3 in the normal operation mode. For this, a compressor 410, a compressor blower fan 420, and an evaporator blower fan 250 may operate.

When a power supplied into the refrigerator 1 is converted into a power of a battery 40, the normal operation mode M100 may be converted into a power failure operation mode M200. Here, the preset temperature D4 may be greater than that D3 in the normal operation mode M100.

Thus, the compressor 410, the compressor blower fan 420, and the evaporator blower fan 250 may operate on a preset temperature Dn that is set to a higher temperature. That is, in the power failure operation mode M200, the operation number or time of the compressor 410, the compressor blower fan 420, and the evaporator blower fan 250 may be reduced. Thus, the power consumption may be significantly reduced to maintain the minimum cooling performance for extended periods of time when using the power of the battery 40.

Also, in the power failure operation mode M200, the preset temperatures $D_{1-n}$ for operating the compressor 410, the compressor blower fan 420, and the evaporator blower fan 250 may increase in stages according to the time elapsing. That is, the preset temperature $D_4$ after the preset time elapses may be greater than the present temperature $D_3$ just when the power failure operation mode M200 is performed. The preset temperature D may increase in stages according to the preset time.

Thus, in the power failure operation mode M200, the rotation number and operation time of the compressor 410, the compressor blower fan 420, and the evaporator blower fan 250 may decrease in stages. Also, as the power failure operation mode M200 is continuously performed, battery consumption per unit time may decrease in stages to reduce a rate of increase of the power consumption in stages.

Figure 21:
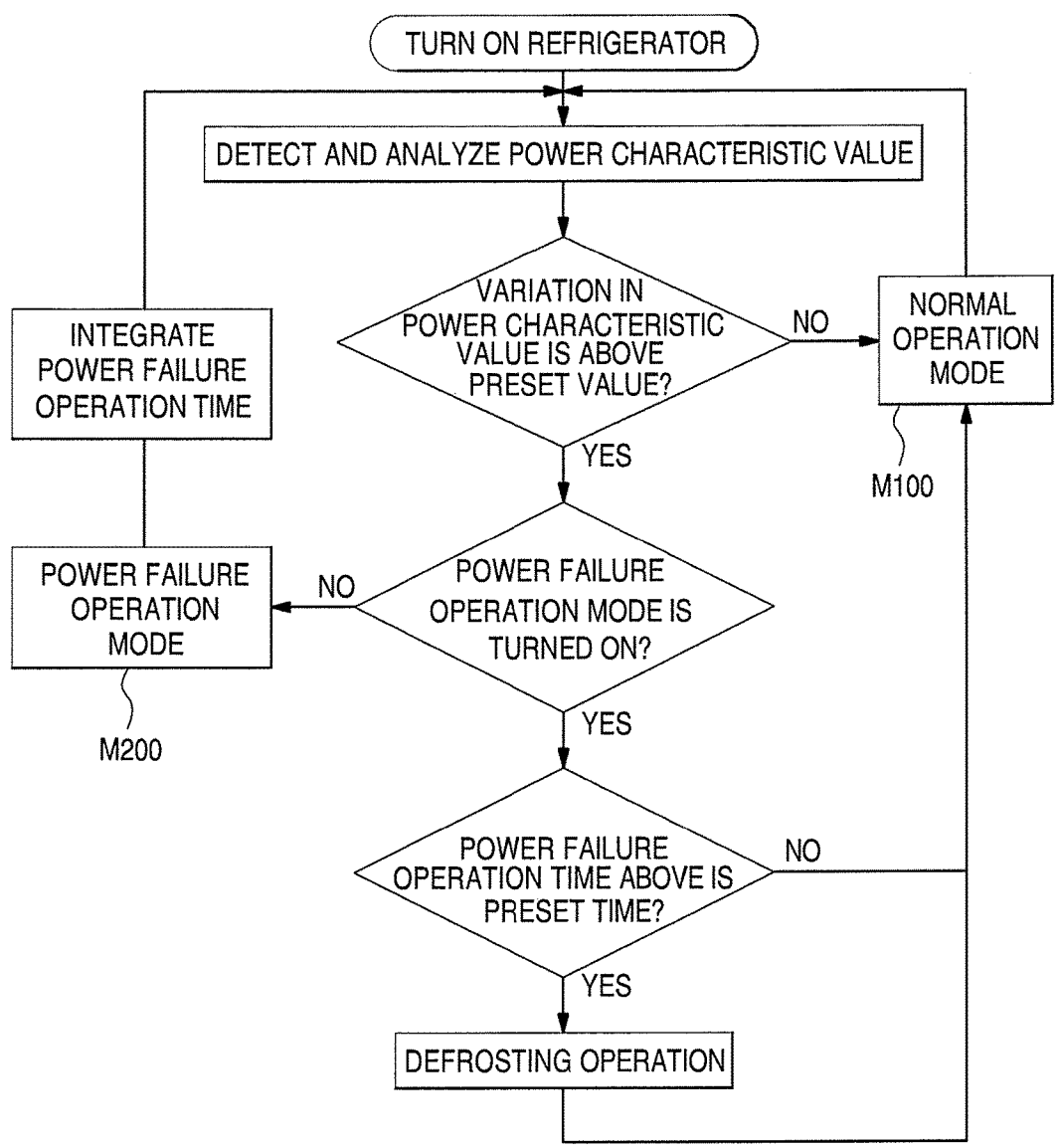
FIG. 21 is a flowchart illustrating a power failure operation mode of a refrigerator according to an eleventh embodiment.

FIG. 21 is a flowchart illustrating a power failure operation mode of a refrigerator according to an eleventh embodiment. When the refrigerator 1 is connected to an external power source 20, power may be supplied into a main body 10 through a commercial power supply unit 30, and a driving unit 70 disposed in the main body 10 may normally operate, in step S2101. Here, the battery 40 may receive the power through the commercial power supply unit 30 and then be charged. Thereafter, the battery 40 may be continuously charged to be always maintained in the fully charged state.

Also, the power supplied from the commercial power supply unit 30 may be analyzed in a power detection unit 50. The power detection unit 50 may analyze proper characteristics of the input power such as a voltage, current, a frequency, and frequency components of the input power, in step S2102. Then, the power detection unit 50 may determine whether the voltage inputted through the analysis process corresponds to the voltage of the external power source 20 or the battery 40, in step S2103.

For example, the power detection unit 50 may operate in the normal operation mode M100 if the input current value is within a preset error range when compared to a preset input value, an input value just before the current is inputted, or an input value before a unit time.

In the normal operation mode M100, the driving unit 70 may operate according to a load, and the input power through the external power source 20 may be maintained. In detail, the normal operation mode M100 may correspond to a normal operation of the refrigerator. Thus, in the normal operation mode M100, the compressor 410 and the evaporator blower fan 250 may operate according to an inner temperature of the refrigerator, which is detected by a temperature sensor 201, and the inner temperature of the refrigerator may be maintained to a preset temperature. Also, a defrosting operation may be performed according to the preset time or condition.

If the current value of the input power gets out of the preset error range when compared to the preset input value, the input value just before the current is inputted, or the input value before the unit time, the power detection unit 50 may determine that the power failure occurs.

If the power detection unit 50 determines that the power failure occurs, the power of the battery 40 may be supplied by the power converter 60. Also, the power of the battery 40 may be supplied into the refrigerator body 10, and simultaneously, the driving unit 70 of the refrigerator body 10 may operate in a low-power operation state. Here, this state may be called a power failure operation mode M200.

Since the power of the battery 40 is inputted, but the power of the external power source 20 is not inputted in the power failure operation mode M200, the operation of the driving unit 70 may be controlled so that a relative small amount of power is consumed. Thus, foods may be stored in the refrigerator by using only the battery 40.

If the prior state corresponds to the normal operation mode M100, but does not correspond to the power failure operation mode M200, the power failure operation mode M200 may be performed immediately, in step S2108. When the change in the characteristics of the input power is detected in the power detection unit 50, in step S2103, while the power failure operation mode M200 is already performed, the power failure operation mode M200 may return to the normal operation mode M100, in step S2110.

That is, when the power failure conditions are solved while the power failure operation mode M200 is performed, the power may be supplied from the external power source 20 into the commercial power supply unit 30, and also, the power may be supplied into the refrigerator body 10 through the commercial power supply unit 30.

Here, the characteristics of the input power may be analyzed in the power detection unit 50 to confirm that the power is inputted from the external power source 20, but is not inputted from the battery 40. When the power of the external power is supplied, the supply of the power of the battery 40 may be blocked in the power converter 60, and the charging state of the battery 40 may be maintained.

In the power failure operation mode M200, the operation time in the power failure operation mode M200 may be integrated by a timer 81, in step 2105. Here, the operation time may be integrated until the power input of the external power source 20 is detected. Also, when the power input of the external power source 20 is detected while the power failure operation mode M200 is continuously performed, the integrated time in the power failure operation mode M200 may be compared to the preset time, in step S2106.

Also, when the integrated time in the power failure operation mode M200 is less than the preset time, the power failure operation mode M200 may be ended to return to the normal operation mode M100. On the other hand, when the integrated time in the power failure operation mode M200 is greater than the preset time, the power failure operation mode M200 may be ended, and the defrosting operation may be performed, in step S2107.

In the power failure operation mode M200, a large amount of frost may be generated on the evaporator 240 or a frost attachment inducing plate 111 due to the features of the embodiment, in which the inside of the refrigerator is cooled by using the cool storage pack 280, and the attachment of the frost onto the evaporator 240 or the frost attachment inducing plate 111 is induced. Thus, if the power failure operation mode M200 is performed for a time that is grater than the preset time, it may be difficult to realize the normal cooling and the air flow performance due to growth of the frost. Thus, when the power failure operation mode M200 is continuously performed for a predetermined time, the defrosting operation may be performed before the power failure operation mode M200 returns to the normal operation mode M100 to completely remove the attached frost by the evaporator 240 or the frost attachment inducing plate 111. Also, after the defrosting operation is finished, the power failure operation mode M200 may return to the normal operation mode M100, in step S2110.

As broadly described and embodied herein, provided is a refrigerator which refrigerator may operate through the battery power supplied from the battery connected to the main body even though a power failure occurs during use of the refrigerator.

Particularly, whether the power is inputted from the external power source or the battery may be determined to operate in the power failure operation mode in which a relatively low power is consumed if the power is inputted from the battery. Therefore, the cooling performance of the refrigerator may be stably maintained by using the battery having relatively small and limited capacity.

The refrigerator may detect power failure to stably supply a power for operating the refrigerator through a battery and, when the power failure occurs, control a driving unit to change in a power failure operation mode in which power consumption is low, thereby continuously maintaining cooling performance of the refrigerator even though the power failure occurs.

In one embodiment, a refrigerator may include: a commercial power supply unit; a battery connected to the commercial power supply unit; a power detection unit detecting blocking of a commercial power supplied from the commercial power supply unit; a power converter supplying a battery power through the battery when the commercial power is blocked by the power detection unit; and a controller detecting power failure when the commercial power is blocked to supply the battery power by the power converter and change a normal operation mode into a power failure operation mode, thereby controlling a driving unit of the refrigerator.

The driving unit may include one of a compressor, an evaporator blower fan, a compressor blower fan, and a cool air adjustment damper. The power converter may be manually manipulated.

The power detection unit and the power converter may be mounted together with each other on the refrigerator. The power detection unit may detect at least one of current, a voltage, a frequency, a frequency component to compare the detected results to preset information. Moreover, the refrigerator may further include a display unit displaying the power failure state to a user when the supplied power is converted into the battery power.

The compressor may include a BLDC compressor that operates at a power that is less than that used during the operation. In the power failure operation mode, the driving unit may be controlled so that the driving unit operates at an input power that is less than that in the normal operation mode. In the power failure operation mode, the compressor may be controlled so that an operation time per a unit time of the compressor decreases when compared to that in the normal operation mode. In the power failure operation mode, the operation time per the unit time may be controlled so that the operation time decreases according to a power failure time elapses.

In the power failure operation mode, a defrosting operation may be controlled so that the defrosting operation is not performed even though a preset defrosting time arrives. In the power failure operation mode, when the compressor operates, the evaporator blower fan and the compressor blower fan may be controlled so that operations of the evaporator blower fan and the compressor blower fan are stopped. In the power failure operation mode, when a preset time elapses, the operation of the compressor may be stopped, and only the evaporator blower fan may operate. In the power failure operation mode, the evaporator blower fan may be controlled so that the evaporator blower fan is turned on/off at a preset time interval.

In the power failure operation mode, the operation of the compressor may be controlled by comparing a detected temperature to a preset temperature of a storage compartment for a preset time, and when the preset time elapses, the compressor may be controlled so that the compressor is turned on/off at a predetermined time interval.

In the power failure operation mode, the compressor may be controlled by setting a control temperature, so that the control temperature is greater than that set in the normal operation mode, to compare a detected inner temperature of the refrigerator to the control temperature. Moreover, when the supply of the commercial power is detected by the power detection unit, the power failure operation mode may be released to return to the normal operation mode.

When the power failure operation mode is converted to return to the normal operation mode, the driving unit may be controlled so that a control temperature in the power failure operation mode is lower than that in the normal operation mode for a preset time when a continuous time in the power failure operation mode is greater than the preset time, and after the preset time elapses, the control temperature may be reset to the control temperature in the normal operation mode.

In another embodiment, a refrigerator may include: a commercial power supply unit; a battery connected to the commercial power supply unit; a power detection unit detecting blocking of a commercial power supplied from the commercial power supply unit; a power converter supplying a battery power through the battery when the commercial power is blocked by the power detection unit; a cool storage unit disposed on a side of a freezing compartment; and a controller detecting power failure when the commercial power is blocked to supply the battery power by the power converter and change a normal operation mode into a power failure operation mode, thereby controlling a driving unit of the refrigerator.

In the power failure operation mode, the compressor may be turned on/off at a preset time interval, and a blower fan blowing cool air into the cool storage unit may be controlled on the basis of a detected inner temperature of the refrigerator. In the power failure operation mode, the blower fan may be turned on/off by setting control temperature, so that the control temperature is greater than that set in the normal operation mode, to compare a detected inner temperature of the refrigerator to the control temperature.

In the power failure operation mode, the control temperature may increase in stages according to time elapsing. When the supply of the commercial power is detected by the power detection unit, the power failure operation mode may be released and converted into the normal operation mode.

When the power failure operation mode is converted to return to the normal operation mode, the driving unit may be controlled so that a control temperature in the power failure operation mode is lower than that in the normal operation mode for a preset time when a continuous time in the power failure operation mode is above the preset time, and after the preset time elapses, the control temperature may be reset to the control temperature in the normal operation mode. When a continuous time in the power failure operation mode is above the preset time, a defrosting operation may be performed within the present time after being converted into the power failure operation mode.

A case supporting the refrigerator may be separately disposed at a lower portion of the refrigerator, and the battery, the power detection unit, and the power converter may be disposed within the case. An accessible drawer may be further disposed within the case, and the battery may be mounted in the drawer.

When the blocking of the commercial power is detected by the power detection unit, a residual level of the battery depending on time elapsing in the power failure operation mode may be displayed. In the power failure operation mode, the driving unit may be controlled to operate at a low rate.

When the power failure operation mode is converted to return to the normal operation mode, a BLDC compressor may operate at a high rate within the preset time, and when the preset time elapses, the high-rate operation of the compressor may be converted into the low-rate operation.

In further another embodiment, a refrigerator may include: a commercial power supply unit; a battery connected to the commercial power supply unit; a power converter supplying a battery power through the battery when the commercial power supplied from the commercial power supply unit is blocked; a cool storage unit disposed in a side of the refrigerator; a first evaporation dish mounted above a compressor disposed in a machine room to collect defrosting water drained from the refrigerator; a second evaporation dish disposed on a bottom of the machine room; and a first connection tube connecting the first evaporation dish to the second evaporation dish to allow the defrosting water to flow from the first evaporation dish to the second evaporation dish.

The first evaporation dish may be seated on a top surface of the compressor, and a border extending upward along a circumference of the first evaporation dish may be disposed to define a water collection space.

A partition wall may be disposed at a portion of the first evaporation dish, on which the first connection tube is disposed, to separate the first connection tube from the water collection space, and when a level of the defrosting water collected into the first evaporation dish is above a predetermined level, the defrosting water may be drained into the second evaporation dish. A second connection tube connected to the bottom of the refrigerator may be connected to the second evaporation dish to drain the defrosting water.

In still another embodiment, a refrigerator may include: a commercial power supply unit; a battery connected to the commercial power supply unit; a power converter supplying a battery power through the battery when the commercial power supplied from the commercial power supply unit is blocked; an evaporator disposed at a rear side of a storage space of the refrigerator to generate cool air; a grill pan partitioning the evaporator from the storage space; a blower fan disposed above the evaporator to blow the cool air; a cool storage pack disposed between a front surface of the evaporator and the grill pan; and a controller detects power failure when the commercial power is blocked to supply the battery power by the power converter and change a normal operation mode into a power failure operation mode, thereby controlling an operation of the blower and supplying the cool air of the cool storage pack into the storage space.

In the power failure operation mode, the blower fan may be repeatedly turned on/off at a preset time interval. In the normal operation mode, the blower fan may be controlled on the basis of a detected inner temperature of the storage space.

The cool storage pack may be disposed to contact a front surface of the evaporator. The cool storage pack may be fixed to a side of the grill pan, and a cooling pin of the evaporator contacts the cool storage pack, and a passage through air within the storage space passes through a space defined by the cooling pin and the cool storage pack when the power failure operation mode is performed may be further provided.

The refrigerator may further include: a discharge hole defined in the grill pan to face the blower fan; a cool air return duct allowing the storage space to communicate with the space in which the evaporator is disposed; a frost attachment inducing plate disposed on the cool air return duct to induce attachment of frost.

The frost attachment inducing plate may be formed of a metal material and contact a side of the evaporator to conduct heat. The frost attachment inducing plate may be connected to a defrosting water receiver disposed under the evaporator to collect defrost water attached to the frost attachment inducing plate into the defrosting water receiver.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
    a power detection unit configured to analyze one of or more than one of a voltage, a current, a frequency, or a frequency component of electric power supplied to the refrigerator and determine whether the supplied electric power is a commercial power or battery power;
    a BLDC compressor operated by the electric power supplied through the power detection unit and configured to start operating at a low peak voltage;
    a power converter configured to immediately covert the supplied electric power from the commercial power to the battery power by using a signal transmitted from the power detection unit; and
    a controller configured to switch an operation of the BLDC compressor from a normal operation mode to a power failure operation mode when the power detection unit determines that the electric power is the battery power,
    wherein, when the supply of electric power from the commercial power supply unit is detected by the power detection unit, the operation mode of the BLDC compressor is configured to return to the normal operation mode from the power failure operation mode,
    wherein, when the operation mode returns to the normal operation mode from the power failure operation mode, and when a duration time of the power failure operation mode is longer than a first preset duration time, a control temperature for controlling the operation of the BLDC compressor is set to be lower than an initially set temperature of a storage space in the normal operation mode, and the BLDC compressor is configured to be operated for a second preset time, and
    wherein, when the second preset time is elapsed, the control temperature for controlling the operation of the BLDC compressor is reset to the initially set temperature of the storage space in the normal operation mode.

2. The refrigerator of claim 1, further comprising a display unit that displays a power failure state when the supplied the electric power is changed from the commercial power to the battery power.

3. The refrigerator of claim 1, wherein, in the power failure operation mode, the refrigerator is controlled such that a defrosting operation is not performed even when a preset time for defrosting arrives.

4. The refrigerator of claim 1, wherein the controller is configured to set a control temperature in the power failure operation mode to be higher than the control temperature in the normal operation mode, for controlling the operation of the BLDC compressor.

5. The refrigerator of claim 1, wherein, when the operation mode returns to the normal operation mode from the power failure operation mode, the control temperature for controlling the operation of the BLDC compressor is reset to the initially set temperature of a storage space in the normal operation mode from a set temperature of the storage space in the power failure operation mode.

6. The refrigerator of claim 1, wherein, in the power failure operation mode, the BLDC compressor is configured to be operated at a low rate.

7. The refrigerator of claim 6, wherein, when the operation mode returns to the normal operation mode from the power failure operation mode, the BLDC compressor is configured to be operated at a high rate for the second preset time.

8. The refrigerator of claim 4, wherein the controller is configured to control the operation of the BLDC compressor by comparing a detected temperature in a storage space and the control temperature.

9. The refrigerator of claim 1, wherein the commercial power is supplied through a commercial power supply unit, and the battery power is supplied from a battery, wherein one of or more than one of the commercial power supply unit, the battery, the power detection unit, and the power converter is disposed outside a refrigerator body and electrically connected to the refrigerator body.

10. The refrigerator of claim 9, wherein one of or more than one of the commercial power supply unit, the battery, the power detection unit, and the power converter are combined to each other to form a module.

11. The refrigerator of claim 9, wherein the power converter is configured to be manually manipulable.

* * * * *